(12) United States Patent
Ochiai

(10) Patent No.: US 11,226,286 B2
(45) Date of Patent: Jan. 18, 2022

(54) INSPECTION APPARATUS, INSPECTION METHOD, LIBRARY GENERATION APPARATUS, LIBRARY GENERATION METHOD, COMPUTER PROGRAM AND RECORDING MEDIUM

(71) Applicant: PIONEER CORPORATION, Tokyo (JP)

(72) Inventor: Takanori Ochiai, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 6 days.

(21) Appl. No.: 16/613,864

(22) PCT Filed: May 9, 2018

(86) PCT No.: PCT/JP2018/017918
§ 371 (c)(1),
(2) Date: Nov. 15, 2019

(87) PCT Pub. No.: WO2018/212037
PCT Pub. Date: Nov. 22, 2018

(65) Prior Publication Data
US 2020/0103341 A1 Apr. 2, 2020

(51) Int. Cl.
*G01J 5/02* (2006.01)
*G01N 21/3586* (2014.01)
(Continued)

(52) U.S. Cl.
CPC ......... *G01N 21/3586* (2013.01); *G01B 11/06* (2013.01); *G01B 15/02* (2013.01)

(58) Field of Classification Search
CPC ..... G01N 21/3586; G01B 11/06; G01B 15/02
See application file for complete search history.

(56) References Cited

U.S. PATENT DOCUMENTS

2011/0267600 A1 11/2011 Ouchi et al.
2013/0222787 A1 8/2013 Kajiki et al.
(Continued)

FOREIGN PATENT DOCUMENTS

CN 102272578 A 12/2011
CN 107429988 A 12/2017
(Continued)

OTHER PUBLICATIONS

Shen et al., "Development and application of terahertz pulsed imaging for nondestructive inspection of pharmaceutical tablet,", 2008, IEEE Journal of Selected Topics in Quantum Electronics, vol. 14, No. 2 pp. 407-415. (Year: 2008).*

(Continued)

*Primary Examiner* — Kiho Kim
(74) *Attorney, Agent, or Firm* — Nixon & Vanderhye

(57) ABSTRACT

An inspection apparatus is provided with: an irradiating device configured to irradiate a sample in which a plurality of layers are laminated with a terahertz wave; a detecting device configured to detect the terahertz wave from the sample to obtain a detected waveform; and an estimating device configured to estimate a position of a boundary surface of the plurality of layers on the basis of the detected waveform and a library indicating an estimated waveform, the library is generated on the basis of a sample waveform that is the detected waveform obtained by irradiating the sample or a sample member with the terahertz wave, the sample member has specifications that are same as those of the sample.

19 Claims, 10 Drawing Sheets

(51) Int. Cl.
  *G01B 11/06*  (2006.01)
  *G01B 15/02*  (2006.01)

(56) References Cited

U.S. PATENT DOCUMENTS

| 2013/0222788 A1 | 8/2013 | Kajiki et al. |
| 2014/0146306 A1 | 5/2014 | Kubota |
| 2016/0245703 A1 | 8/2016 | Takase et al. |
| 2018/0038681 A1 | 2/2018 | Van Mechelen |

FOREIGN PATENT DOCUMENTS

| EP | 3265747 A1 | 1/2018 |
| EP | 3 524 930 A1 | 8/2019 |
| JP | 2010-156664 A | 7/2010 |
| JP | 2013-200299 A | 10/2013 |
| JP | 2014-122875 A | 7/2014 |
| JP | 2016-151562 A | 8/2016 |
| WO | 2010/076874 A1 | 7/2010 |
| WO | 2016/132452 A1 | 8/2016 |
| WO | 2016/138935 A1 | 9/2016 |

OTHER PUBLICATIONS

Zhong et al., "Quantification of thin-film coating thickness of pharmaceutical tablets using wavelet analysis of terahertz pulsed imaging data,", 2009, 34th International Conference on Infrared, Millimeter, and terahertz waves, 2 pages. (Year: 2009).*

Kniffin et al., "Model-based material parameter estimation for terahertz reflection spectroscopy," IEEE Transactions on terahertz science and technology, vol. 2, No. 2, pp. 231-241. (Year: 2012).*

International Search Report, dated May 9, 2018, from corresponding PCT application No. PCT/JP2018/017918.

* cited by examiner

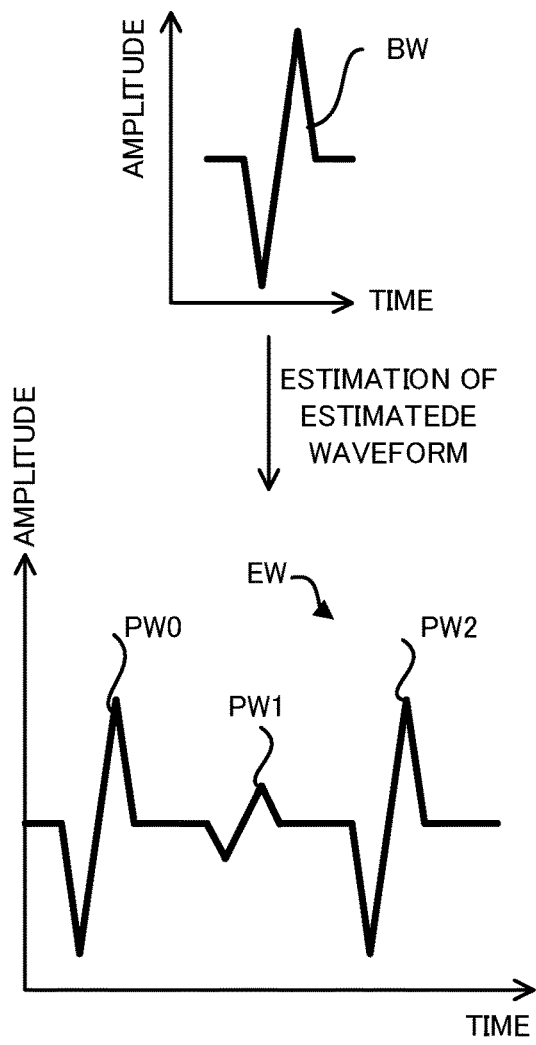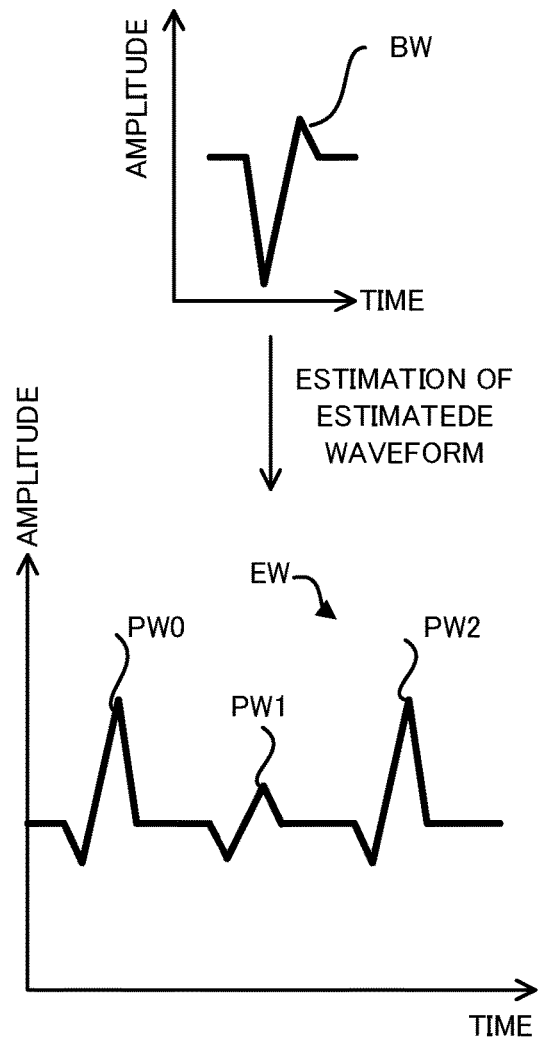
FIG. 7A
FIG. 7B
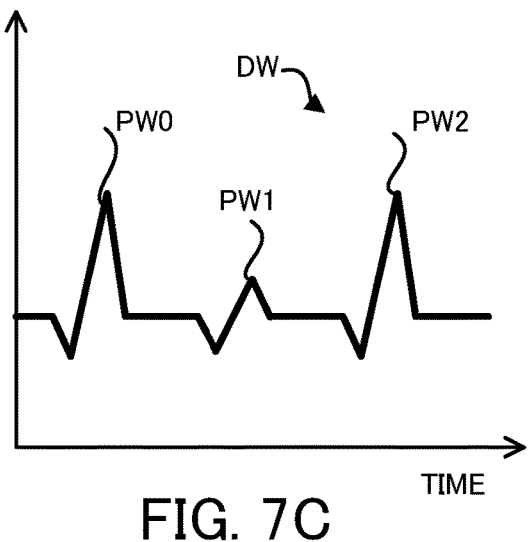
FIG. 7C

INSPECTION APPARATUS, INSPECTION METHOD, LIBRARY GENERATION APPARATUS, LIBRARY GENERATION METHOD, COMPUTER PROGRAM AND RECORDING MEDIUM

TECHNICAL FIELD

The present invention relates to a technical field of an inspection apparatus and an inspection method that is configured to estimate a position of a boundary surface of a plurality of layers that constitute a sample by using a terahertz wave, a library generation apparatus and a library generation method that is configured to generate a library used by the inspection apparatus and the inspection method to estimate the position of the boundary surface, a computer program that is configured to allow a computer to execute this inspection method or this library generation method, and a recording medium on which this computer program is recorded, for example.

BACKGROUND ART

An inspection apparatus using a terahertz wave is known. A terahertz wave inspection apparatus is configured to estimate (in other words, calculate or specify) characteristics of a sample in accordance with a below described procedure. Firstly, a pump light (in other words, an excitation light) is irradiated to a terahertz wave generating element to which a bias voltage is applied, wherein the pump light is one laser light that is obtained by branching an ultrashort pulse laser light (for example, a femtosecond pulse laser light). As a result, the terahertz wave generating element generates the terahertz. The terahertz wave generated by the terahertz wave generating element is irradiated to the sample. The terahertz wave irradiated to the sample is irradiated, as a reflected terahertz wave (alternatively, a transmitted terahertz wave) from the sample, to a terahertz wave detecting element to which a probe light (in other words, an excitation light) is irradiated, wherein the probe light is another laser light that is obtained by branching the ultrashort pulse laser light and has an optical delay (namely, a difference of a length of an light path) with respect to the pump light. As a result, the terahertz wave detecting element detects the terahertz wave reflected by or transmitted through the sample. The terahertz wave inspection apparatus estimates the characteristics of the sample by analyzing the detected terahertz wave (namely, the terahertz wave in a time domain and an electrical current signal).

When the sample is a laminated object in which a plurality of layers are laminated, a thickness of the layer is one example of the characteristics that can be estimated by the terahertz wave inspection apparatus. Patent Literature 1 disclose one example of the terahertz wave inspection apparatus that is capable of estimating the thickness. Specifically, the terahertz wave inspection apparatus disclosed in the Patent Literature 1 is configured to estimates the thickness by executing an operation of comparing a pulse waveform (hereinafter, it is referred to as an "estimated waveform") that is estimated to be included in the terahertz wave reflected by the sample that is characterized by a certain parameter (for example, the thickness, a material and so on) and an actually detected terahertz (hereinafter, it is referred to as a "detected waveform") a plurality of times for the plurality of estimated waveforms that correspond to a plurality of different parameters, respectively.

CITATION LIST

Patent Literature

Patent Literature 1: Japanese Unexamined Patent Application Publication No. 2014-122875

SUMMARY OF INVENTION

Technical Problem

The estimated waveform is generated as follows. Firstly, a reference waveform of the terahertz wave is set on the basis of a detection result of a waveform of the terahertz wave reflected by a reference plate having a desired reflectance (alternatively, passing through a reference plate having a desired transmittance). Then, a propagating aspect of the terahertz wave having the set reference waveform in the sample is estimated by using a simulation model of the sample. The estimated waveform is generated on the basis of this estimation result.

However, there is a possibility that characteristics of the reference plate is greatly different from characteristics of the sample. In this case, there is a possibility that an estimation accuracy of the estimated result deteriorates. As one example, when a surface of the sample to which the terahertz wave is irradiated is relatively rough or a shape of the surface of the sample includes a complicated concavity and convexity, the terahertz wave is diffused at the surface of the sample. As a result, when the terahertz wave is diffused at the surface of the sample, an intensity of the terahertz wave propagating in the sample is smaller, compared to the case where the terahertz wave is not diffused at the surface of the sample. As another one example, when a reflectance of the sample to the terahertz wave (especially, a reflectance of a member constituting the surface of the sample) is relatively high, an intensity of the terahertz wave propagating in the sample is smaller, compared to the case where the reflectance of the sample to the terahertz wave is relatively low. However, the reference waveform is obtained without considering the difference between the characteristics of the reference plate and the characteristics of the sample. Thus, there is a possibility that the estimated waveform estimated on the basis of the reference waveform is greatly different from the waveform of the terahertz wave actually propagating in the sample, even if the estimated waveform is generated by using the simulation model of the sample. Namely, there is a possibility that an accuracy of the estimated waveform that is estimated on the basis of the reference waveform deteriorates. When the accuracy of the estimated waveform deteriorates, there is a possibility that an estimation accuracy of the thickness based on the estimated waveform also deteriorates.

Note that an operation for estimating the thickness of a certain layer is substantially equivalent to an operation for estimating a position of a boundary surface of a certain layer, because the thickness is estimated on the basis of the pulse waveform corresponding to the reflected wave of the terahertz wave from the boundary surface of a certain layer The above described technical problem is one example of the technical problem to be solved by the present invention. It is therefore an object of the present invention to provide, for example, an inspection apparatus and an inspection method that is capable of properly estimating a position of a boundary surface of a plurality of layers, a library generation apparatus and a library generation method that is configured to generate a library indicating an estimated waveform used by this inspection apparatus ore this inspection method, a computer program that allows a computer to execute this inspection method or this library generation method, and a recording medium on which this computer program is recorded.

Solution to Problem

A first aspect of an inspection apparatus is provided with: an irradiating device that is configured to irradiate a sample in which a plurality of layers are laminated with a terahertz wave; a detecting device that is configured to detect the terahertz wave from the sample to obtain a detected waveform; and an estimating device that is configured to estimate a position of a boundary surface of the plurality of layers on the basis of the detected waveform and a library that indicates an estimated waveform of the terahertz wave from the sample, the library is generated on the basis of a sample waveform that is the detected waveform obtained by irradiating the sample or a sample member with the terahertz wave, the sample member having specifications that are same as those of the sample A first aspect of an inspection method includes: an irradiating step at which a terahertz wave is irradiated to a sample in which a plurality of layers are laminated; a detecting step at which the terahertz wave from the sample is detected to obtain a detected waveform; and an estimating step at which a position of a boundary surface of the plurality of layers is estimated on the basis of the detected waveform and a library that indicates an estimated waveform of the terahertz wave from the sample, the library is generated on the basis of a sample waveform that is the detected waveform obtained by irradiating the sample or a sample member with the terahertz wave, the sample member having specifications that are same as those of the sample.

A first aspect of a library generation apparatus is provided with: an obtaining device that is configured to obtain a waveform information relating to a detected waveform of a terahertz wave from a sample or a sample member to which the terahertz wave is irradiated, the sample member having specifications that are same as those of the sample; and a generating device that is configured to generate a library indicating an estimated waveform of the terahertz wave from the sample on the basis of the waveform information.

A first aspect of a library generation method includes: an obtaining step at which a waveform information relating to a detected waveform of a terahertz wave from a sample or a sample member to which the terahertz wave is irradiated is obtained, the sample member having specifications that are same as those of the sample; and a generating step at which a library indicating an estimated waveform of the terahertz wave from the sample is generated on the basis of the waveform information.

A first aspect of a computer program allows a computer to execute the above described first aspect of the inspection method. A second aspect of a computer program allows a computer to execute the above described first aspect of the library generation method.

A first aspect of a recording medium is a recording medium on which the above described first or second aspect of the computer program is recorded.

BRIEF DESCRIPTION OF DRAWINGS

FIG. 7A is a waveform diagram that illustrates the estimated waveform generated from the reference waveform illustrated in a lower part of FIG. 6A (namely, the reference waveform in a comparison example), FIG. 7B is a waveform diagram that illustrates the estimated waveform generated from the reference waveform BW illustrated in a lower part of FIG. 6A (namely, the reference waveform in the present example), and FIG. 7C is a waveform diagram that illustrates the detected waveform of the terahertz THz irradiated to the sample.

Each of FIG. 10A

DESCRIPTION OF EMBODIMENTS

Figure 1:
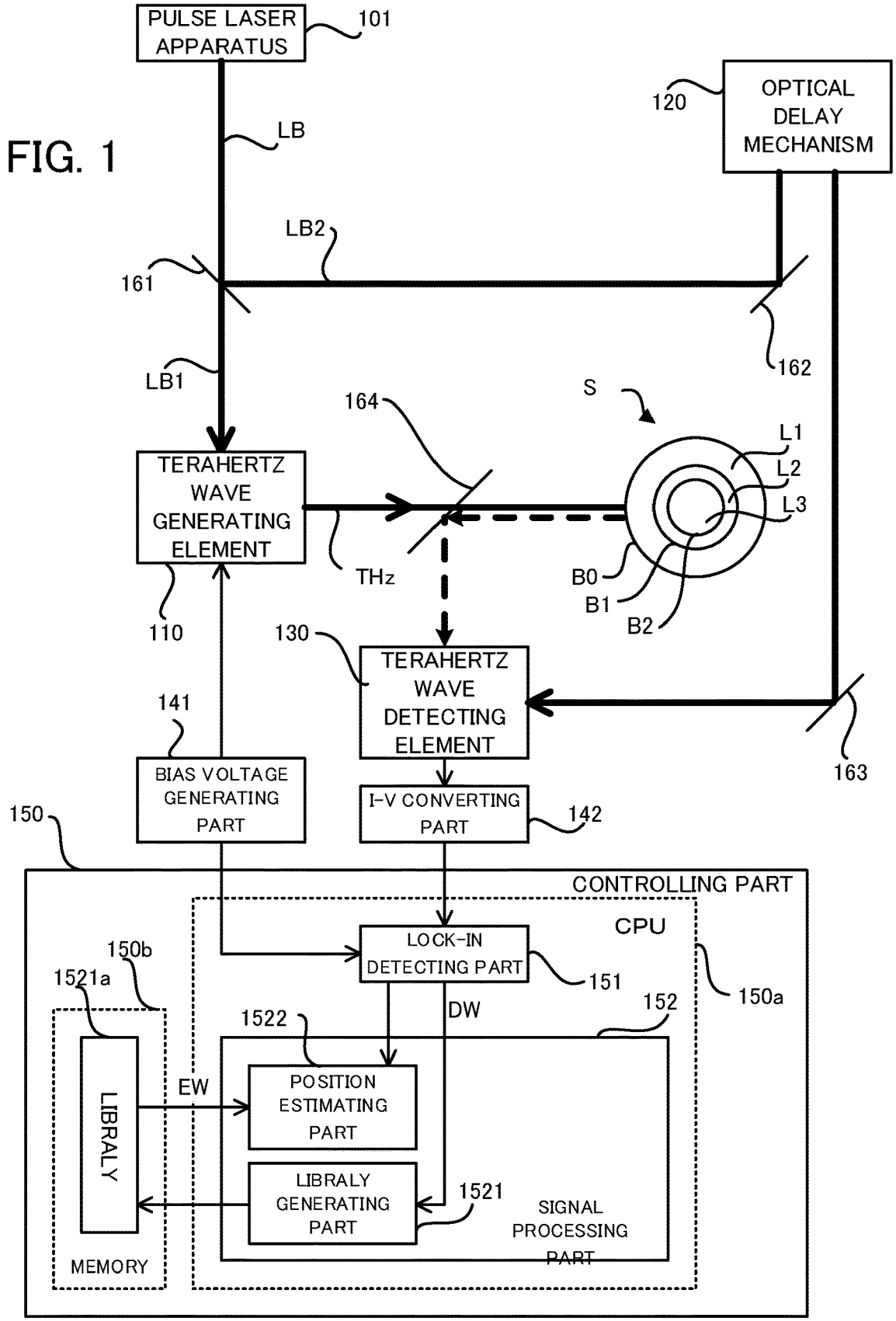
FIG. 1 is a block diagram that illustrates a structure of a terahertz wave inspection apparatus in a present example.

Hereinafter, one embodiment of an inspection apparatus, an inspection method, a library generation apparatus, a library generation method, a computer program and a recording medium will be described.

Embodiment of Inspection Apparatus

<1>
An embodiment of an inspection apparatus is provided with: an irradiating device that is configured to irradiate a sample in which a plurality of layers are laminated with a terahertz wave; a detecting device that is configured to detect the terahertz wave from the sample to obtain a detected waveform; and an estimating device that is configured to estimate a position of a boundary surface of the plurality of layers on the basis of the detected waveform and a library that indicates an estimated waveform of the terahertz wave from the sample, the library is generated on the basis of a sample waveform that is the detected waveform obtained by irradiating the sample or a sample member with the terahertz wave, the sample member having specifications that are same as those of the sample.

According to the embodiment of an inspection apparatus, there is a less possibility that the estimated waveform is greatly different from the waveform of the terahertz wave actually propagating in the sample, compared to the case where the library (namely, the estimated waveform) is generated on the basis of the detected waveform of the terahertz wave that is irradiated to a reference plate different from the sample. Namely, an accuracy of the estimated waveform improves. Thus, an estimation accuracy of the position of the boundary surface based on the estimated waveform also improves. Therefore, the embodiment of the inspection apparatus is capable of properly estimating the position of the boundary surface of the plurality of layers.

<2>

In another aspect of the embodiment of the inspection apparatus, the library is generated on the basis of a first pulse waveform that corresponds to an outer surface of the sample or the sample member and that is included in the sample waveform.

According to this aspect, the accuracy of the estimated waveform improves. Therefore, the inspection apparatus is capable of properly estimating the position of the boundary surface of the plurality of layers.

<3>

In another aspect of the inspection apparatus that is configured to generate the library on the basis of the first pulse waveform as described above, the library is generated by a simulation using a reference pulse wave that is set on the basis of the first pulse wave.

According to this aspect, the accuracy of the estimated waveform improves. Therefore, the inspection apparatus is capable of properly estimating the position of the boundary surface of the plurality of layers.

<4>

In another aspect of the inspection apparatus that is configured to generate the library on the basis of the first pulse waveform as described above, the library is generated by a simulation using a reference pulse wave that is obtained by inverting the first pulse wave.

According to this aspect, the accuracy of the estimated waveform improves. Therefore, the inspection apparatus is capable of properly estimating the position of the boundary surface of the plurality of layers.

<5>

In another aspect of the inspection apparatus that is configured to generate the library on the basis of the first pulse waveform as described above, the first pulse wave corresponds to a main pulse of the terahertz wave, the library is generated on the basis of the first pulse waveform and a second pulse waveform that corresponds to an accompanying pulse included in the terahertz wave to accompany the main pulse of the terahertz wave and that is included in the sample waveform.

According to this aspect, not only the first pulse waveform but also the second pulse waveform is used when the library is generated. Thus, the accuracy of the estimated waveform improves more. Therefore, the inspection apparatus is capable of estimating the position of the boundary surface of the plurality of layers more properly.

<6>

In another aspect of the inspection apparatus that is configured to generate the library on the basis of the first and second pulse waveforms as described above, a frequency of the accompanying pulse is lower than that of the main pulse.

According to this aspect, the inspection apparatus is capable of estimating the position of the boundary surface of the plurality of layers more properly.

<7>

In another aspect of the inspection apparatus that is configured to generate the library on the basis of the first and second pulse waveforms as described above, the accompanying pulse includes a noise pulse.

According to this aspect, the inspection apparatus is capable of estimating the position of the boundary surface of the plurality of layers more properly.

<8>

In another aspect of the inspection apparatus that is configured to generate the library on the basis of the first and second pulse waveforms as described above, the library is generated by a simulation using a reference pulse wave that is set on the basis of the first and second pulse waves.

According to this aspect, the inspection apparatus is capable of estimating the position of the boundary surface of the plurality of layers more properly.

<9>

In another aspect of the inspection apparatus that is configured to generate the library on the basis of the first and second pulse waveforms as described above, the library is generated by a simulation using a reference pulse wave that is obtained by inverting the first and second pulse waves.

According to this aspect, the inspection apparatus is capable of estimating the position of the boundary surface of the plurality of layers more properly.

<10>

In another aspect of the inspection apparatus that is configured to generate the library on the basis of the first pulse waveform as described above, the first pulse waveform includes a pulse waveform corresponding to the terahertz that is reflected by the outer surface of the sample or the sample member and that is included in the sample waveform.

According to this aspect, the accuracy of the estimated waveform improves, when the detecting device detects the terahertz wave reflected by the outer surface of the sample. Therefore, the inspection apparatus is capable of properly estimating the position of the boundary surface of the plurality of layers.

<11>

In another aspect of the inspection apparatus that is configured to generate the library on the basis of the first pulse waveform as described above, the first pulse waveform includes a pulse waveform that is influenced by a reflectance at the outer surface of the sample or the sample member and that is included in the sample waveform.

According to this aspect, the accuracy of the estimated waveform improves, when the detecting device detects the terahertz wave reflected by the outer surface of the sample. Therefore, the inspection apparatus is capable of properly estimating the position of the boundary surface of the plurality of layers.

<12>

Another aspect of the embodiment of the inspection apparatus is further provided with a generating device that is configured to generate the library.

According to this aspect, the inspection apparatus is capable of generating the library. Therefore, the inspection apparatus is capable of properly estimating the position of the boundary surface of the plurality of layers on the basis of the generated library.

<13>

In another aspect of the inspection apparatus that is provided with the generating device as described above, the irradiating device irradiates the sample or the sample member with the terahertz wave, the detecting device detects the terahertz wave from the sample or the sample member to obtain the sample waveform, the generating device obtains a waveform information relating to the sample waveform from the detecting device and generates the library by using the waveform information.

According to this aspect, the inspection apparatus is capable of properly generating the library.

<14>

In another aspect of the embodiment of the inspection apparatus, the estimating device estimates the position of a first boundary surface of the plurality of layers on the basis of a boundary surface pulse waveform and the library, the boundary surface pulse waveform appearing in the detected waveform to correspond to a second boundary surface of the plurality of layers, the second boundary surface being farther from the outer surface than the first boundary surface is.

According to this aspect, the inspection apparatus is capable of properly estimating the position of the first boundary surface.

Note that the estimating device may not necessarily using the boundary surface pulse waveform appearing in the detected waveform to correspond to the second boundary surface and the library in order to estimate the position of the first boundary surface. For example, the estimating device may estimate the position of the first boundary surface on the basis of a boundary surface pulse waveform appearing in the detected waveform to correspond to the first boundary surface and the library. For example, the estimating device may estimate the position of the first boundary surface on the basis of a boundary surface pulse waveform appearing in the detected waveform to correspond to a third boundary surface that is closer to the outer surface than the first boundary surface and the library.

Embodiment of Inspection Method

<15>

An embodiment of an inspection method includes: an irradiating step at which a terahertz wave is irradiated to a sample in which a plurality of layers are laminated; a detecting step at which the terahertz wave from the sample is detected to obtain a detected waveform; and an estimating step at which a position of a boundary surface of the plurality of layers is estimated on the basis of the detected waveform and a library that indicates an estimated waveform of the terahertz wave from the sample, the library being generated on the basis of a sample waveform that is the detected waveform obtained by irradiating the sample or a sample member with the terahertz wave, the sample member having specifications that are same as those of the sample.

According to the embodiment of the inspection method, it is possible to achieve an effect that is same as an effect achievable by the above described embodiment of the inspection apparatus. Note that the embodiment of the inspection method may adopt various aspects in accordance with the various aspects that are adopted by the embodiment of the inspection apparatus.

Embodiment of Library Generation Apparatus

<16>

An embodiment of a library generation apparatus is provided with: an obtaining device that is configured to obtain a waveform information relating to a detected waveform of a terahertz wave from a sample or a sample member to which the terahertz wave is irradiated, the sample member having specifications that are same as those of the sample; and a generating device that is configured to generate a library indicating an estimated waveform of the terahertz wave from the sample on the basis of the waveform information.

According to the embodiment of the library generation apparatus, the library used by the above described embodiment of the inspection apparatus can be generated properly. Note that the embodiment of the library generation apparatus may adopt various aspects in accordance with the various aspects that are adopted by the embodiment of the inspection apparatus.

Embodiment of Library Generation Method

<17>

An embodiment of a library generation method includes: an obtaining step at which a waveform information relating to a detected waveform of a terahertz wave from a sample or a sample member to which the terahertz wave is irradiated is obtained, the sample member having specifications that are same as those of the sample; and a generating step at which a library indicating an estimated waveform of the terahertz wave from the sample is generated on the basis of the waveform information.

According to the embodiment of the library generation method, the library used by the above described embodiment of the inspection apparatus can be generated properly. Note that the embodiment of the library generation method may adopt various aspects in accordance with the various aspects that are adopted by the embodiment of the inspection apparatus.

Embodiment of Computer Program

<18>

A first embodiment of a computer program allows a computer to execute the above described embodiment of the inspection method.

According to the first embodiment of the computer program, it is possible to achieve an effect that is same as an effect achievable by the above described embodiment of the inspection method. Note that the first embodiment of the computer program may adopt various aspects in accordance with the various aspects that are adopted by the embodiment of the inspection method.

<19>

A second embodiment of a computer program allows a computer to execute the above described embodiment of the library generation method.

According to the second embodiment of the computer program, it is possible to achieve an effect that is same as an effect achievable by the above described embodiment of the library generation method. Note that the second embodiment of the computer program may adopt various aspects in accordance with the various aspects that are adopted by the embodiment of the library generation method.

Embodiment of Recording Medium

<20>

An embodiment of a recording medium is a recording medium on which the above described first or second embodiment of the computer program.

According to the embodiment of the recording, it is possible to achieve an effect that is same as an effect achievable by the above described embodiment of the inspection method or the above described embodiment of the library generation method. Note that the embodiment of the recording may adopt various aspects in accordance with the various aspects that are adopted by the embodiment of the inspection method or the embodiment of the library generation method. Moreover, the recording medium is a recording medium readable by the computer.

The operations and other advantages of the embodiments of the inspection apparatus, the inspection method, the library generation apparatus, the library generation method, the computer program and the recording medium will become more apparent from the examples explained below.

As described above, the embodiment of the inspection apparatus is provided with the irradiating device, the detecting device and the estimating device. The embodiment of the inspection method includes the irradiating step, the detecting step and the estimating step. The embodiment of the library generation apparatus is provided with the obtaining device and the generating device. The embodiment of the library generation method includes the obtaining step and the generating step. The first embodiment of the computer program allows the computer to execute the above described embodiment of the inspection method. The second embodiment of the computer program allows the computer to execute the above described embodiment of the library generation method. The embodiment of the recording medium is a recording medium on which the above described first or second embodiment of the computer program is recorded. Thus, it is possible to properly estimate the position of the boundary surface of the plurality of layers.

EXAMPLE

Hereinafter, with reference to drawings, an example of an inspection apparatus, an inspection method, a library generation apparatus, a library generation method, a computer program and a recording medium will be described. Especially, in the below described description, an example in which the inspection apparatus, the inspection method, a library generation apparatus, a library generation method, the computer program and the recording medium are adapted to a terahertz wave inspection apparatus will be described. Note that the terahertz wave inspection apparatus is configured to estimate a position of a boundary surface of a plurality of layers by detecting a terahertz wave from a sample in which the plurality of layers are laminated (layered).

(1) Structure of Terahertz Wave Inspection Apparatus 100

Firstly, with reference to FIG. 1, a structure of the terahertz wave inspection apparatus 100 in a present example will be described. FIG. 1 is a block diagram that illustrates the structure of the terahertz wave inspection apparatus 100 in the present example As illustrated in FIG. 1, the terahertz wave inspection apparatus 100 is configured to irradiate a sample S in which a plurality of layers L are laminated with a terahertz wave THz propagating along a direction that intersects with a laminated direction of the plurality of layers L. Moreover, the terahertz wave inspection apparatus 100 is configured to detect the terahertz wave THz reflected by the sample S (namely, the terahertz wave THz irradiated to the sample S).

The terahertz wave THz is an electromagnetic wave including an electromagnetic wave component in a frequency range around one terahertz (1 THz=$10^{12}$ Hz) (namely, in a terahertz range). The terahertz range is a frequency range having characteristics of a straight propagating ability of a light and a transmitting ability of the electromagnetic wave. The terahertz range is a frequency range in which various substances have unique spectrums. Therefore, the terahertz wave inspection apparatus 100 is capable of estimating (in other words, measuring) characteristics of the sample S by analyzing the terahertz wave THz irradiated to the sample S.

In the present example, the sample S in which three layers L (specifically, a layer L1, a layer L2 and a layer L3) are laminated is used for the description. The layer L1 to the layer L3 are made from substances having different physicality from one another, respectively. At least one of the layer L1 to the layer L3 may be made from a solid material. At least one of the layer L1 to the layer L3 may be made from a liquid material. At least one of the layer L1 to the layer L3 may be made from a gaseous material.

A pipe in which chemical flows is one example of the sample S in which the layer L1 to the layer L3 are laminated. In this case, as illustrated in FIG. 1, the sample S has a pipe wall layer L1 that is one example of the layer L1, a pipe wall layer L2 that is one example of the layer L2 and a pipeline layer L3 that is one example of the layer L3. The pipe wall layer L1 is a tubular wall part that is at an outer side (namely, a farther side from the pipeline layer L3) of the pipe wall layer L2 of the tubular wall that constitutes the pipe. The pipe wall layer L1 is a tubular wall part of the tubular wall that constitutes the pipe to which the chemical flowing in the pipeline layer L3 is not infiltrated. The pipe wall layer L2 is a tubular wall part that is at an inner side (namely, a closer side to the pipeline layer L3) of the pipe wall layer L1 of the tubular wall that constitutes the pipe. The pipe wall layer L2 is a tubular wall part of the tubular wall that constitutes the pipe to which the chemical flowing in the pipeline layer L3 is infiltrated. The pipeline layer L3 is a layer that is surrounded by the pipe wall layer L2 and that corresponds to a flow path in which the chemical flows. When the chemical flows in the pipeline wall L3, the pipeline wall L3 is a liquid layer. On the other hand, when the chemical does not flow in the pipeline wall L3, the pipeline wall L3 is a gaseous layer (for example, an air and the like). Therefore, it can be said that the pipeline wall L3 is a layer a phase of which changes. A physicality of the pipe wall layer L1 is different from a physicality of the pipe wall layer L2, because the pipe wall layer L1 is the wall part to which the chemical is not infiltrated and the pipe wall layer L2 is the wall part to which the chemical is infiltrated. Moreover, a physicality of the pipeline layer L3 is different from the physicality of the pipe wall layer L1 and the physicality of the pipe wall layer L2.

The terahertz wave inspection apparatus 100 is configured to estimate, as the characteristics of the sample S, a position of a boundary surface B of the plurality of layers L that constitutes the sample S. Here, the boundary surface B is a surface that forms a boundary of the layer L. Especially, the boundary surface B is a surface that intersects with an irradiation direction of the terahertz wave THz, because the terahertz wave inspection apparatus 100 estimates the position of the boundary surface B. In the present example, there are a boundary surface B0, a boundary surface B1 and a boundary surface B2, as the boundary surface B. The boundary surface B0 forms a boundary between the layer L1 and an outside of the sample S. Namely, the layer L1 faces the outside of the sample S via the boundary surface B0. Note that the boundary surface B0 is referred to as an "outer surface B0" in the below described description, because the boundary surface B0 is the outer surface of the sample S. The boundary surface B1 forms a boundary between the layer L1 and the layer L2. Namely, the layer L1 faces the layer L2 via the boundary surface B1. The boundary surface B2 forms a boundary between the layer L2 and the layer L3. Namely, the layer L2 faces the layer L3 via the boundary surface B2.

A cycle of the terahertz wave THz that is irradiated to the sample S in order to estimate the position of the boundary surface B is a cycle on the order of sub-pico seconds, and thus, it is technically difficult to directly detect a waveform of the terahertz wave THz. Thus, the terahertz wave inspection apparatus 100 is configured to indirectly detect the waveform of the terahertz wave THz by using a pump probe method based on a time delay scanning. Next, the terahertz wave inspection apparatus 100 using the pump probe method will be described in detail.

As illustrated in FIG. 1, the terahertz wave inspection apparatus 100 is provided with a pulse laser apparatus 101, a terahertz wave generating element 110 that is one specific example of the "irradiating device", a beam splitter 161, a reflective mirror 162, a reflective mirror 163, a half mirror 164, an optical delay mechanism 120, a terahertz wave detecting element 130 that is one specific example of the "detecting device", a bias voltage generating part 141, a I-V (electrical current-electrical voltage) converting part 142 and a controlling part 150.

The pulse laser apparatus 101 is configured to generate a pulse laser light LB that is on the order of the sub-pico seconds or a femto seconds and that has a light intensity based on a driving electrical current inputted to the pulse laser apparatus 101. The pulse laser light LB generated by the pulse laser apparatus 101 enters the beam splitter 161 via a not-illustrated light guiding path (for example, an optical fiber).

The beam splitter 161 is configured to divide (branch) the pulse laser light LB into a pump light LB1 and a probe light LB2. The pump light LB1 enters the terahertz wave generating element 110 via a not-illustrated light guiding path. On the other hand, the probe light LB2 enters the optical delay mechanism 120 via a not-illustrated light guiding path and the reflective mirror 162. Then, the probe light LB2 emitted from the optical delay mechanism 120 enters the terahertz wave detecting element 130 via the reflective mirror 163 and a not-illustrated light guiding path.

The terahertz wave generating element 110 is configured to emit the terahertz wave THz. Specifically, the terahertz wave generating element 110 has a pair of electrodes that face with each other through a gap. A bias voltage generated by the bias voltage generating part 141 is applied to the gap via a pair of electrodes. When the pump light LB1 is irradiated to the gap in the situation where an effective bias voltage (for example, the bias voltage that is not 0 volt) is applied to the gap, the pump light LB1 is also irradiated to a photoconductive layer formed under the gap. In this case, a carrier is generated by a photoexcitation caused by the pump light LB1 at the photoconductive layer to which the pump light LB1 is irradiated. As a result, a pulsed electrical current signal on the order of the sub-pico seconds or a femto seconds based on the generated carrier is generated at the terahertz wave generating element 110. The generated electrical current signal flows through a pair of the electrodes. As a result, the terahertz wave generating element 110 emits the pulsed terahertz wave THz caused by the pulsed electrical current signal.

The terahertz wave THz emitted from the terahertz wave generating element 110 passes through the half mirror 164. As a result, the terahertz wave THz passing through the half mirror 164 is irradiated to the sample S (especially, the outer surface B0 of the layer L1). The terahertz wave THz irradiated to the sample S is reflected by the sample S (especially, each of the outer surface B0, the boundary surface B1 and the boundary surface B2). The terahertz wave THz reflected by the sample S is reflected by the half mirror 164. The terahertz wave THz reflected by the half mirror 164 enters the terahertz wave detecting element 130.

The terahertz wave detecting element 130 is configured to detect the terahertz wave THz entering the terahertz wave detecting element 130. Specifically, the terahertz wave detecting element 130 has a pair of electrodes that face with each other through a gap. When the probe light LB2 is irradiated to the gap, the probe light LB2 is also irradiated to a photoconductive layer formed under the gap. In this case, a carrier is generated by a photoexcitation caused by the probe light LB2 at the photoconductive layer to which the probe light LB2 is irradiated. As a result, an electrical current signal based on the carrier flows through a pair of the electrodes. When the terahertz wave THz is irradiated to the terahertz wave detecting element 130 in the situation where the probe light LB2 is irradiated to the gap, a signal intensity of the electrical current flowing through a pair of the electrodes varies depending on a light intensity of the terahertz wave THz. The electrical current having the signal intensity that varies depending on the light intensity of the terahertz wave THz is outputted to the I-V converting part 142 via a pair of the electrodes.

The optical delay mechanism 120 is configured to adjust a difference between a length of a light path of the pump light LB1 and a length of a light path of the probe light LB2 (namely, a light path length difference). Specifically, the optical delay mechanism 120 adjusts the light path length difference by adjusting the length of the light path of the probe light LB2. When the light path length difference is adjusted, a temporal difference between a timing at which the pump light LB1 enters the terahertz wave generating element 110 (alternatively, a timing at which the terahertz wave generating element 110 emits the terahertz wave THz) and a timing at which the probe light LB2 enters the terahertz wave detecting element 130 (alternatively, a timing at which the terahertz wave detecting element 130 detects the terahertz wave THz). The terahertz wave inspection apparatus 100 indirectly detects the waveform of the terahertz wave THz by adjusting this temporal difference. For example, when the optical delay mechanism 120 increases the length of the light path of the probe light LB2 by 0.3 mm (note that this is a length of the light path in the air), the timing at which the probe light LB2 enters the terahertz wave detecting element 130 is delayed by 1 pico second. In this case, the timing at which the terahertz wave detecting element 130 detects the terahertz wave THz is delayed by 1 pico second. Considering that the terahertz wave THz having same waveform repeatedly enters the terahertz wave detecting element 130 with a cycle of several dozen of megahertz, gradually shifting the timing at which the terahertz wave detecting element 130 detects the terahertz wave THz allows the terahertz wave detecting element 130 to indirectly detect the waveform of the terahertz wave THz. Namely, the waveform of the terahertz wave THz is detectable on the basis of the detected result of the terahertz wave detecting element 130 by a below described lock-in detecting part 151.

The electrical current outputted from the terahertz wave detecting element 130 is converted into a voltage signal by the I-V converting part 142.

The controlling part 150 is configured to execute a control operation for controlling an entire operation of the terahertz wave inspection apparatus 100. The controlling part 150 has a CPU (Central Processing Unit) 150a and a memory 150b. A computer program that allows the controlling part 150 to execute the control operation is recorded in the memory 150b. When the CPU 150a executes this computer program, a logical processing block for executing the control operation is generated in the CPU 150a. However, the computer program may not be recorded in the memory 150b. In this case, the CPU 150a may execute the computer program downloaded via a network.

The controlling part 150 is configured to execute, as one example of the control operation, an estimation operation for estimating the characteristics of the sample S on the basis of the detected result of the terahertz wave detecting element 130 (namely, the voltage signal outputted from the I-V converting part 142). In order to execute the estimation operation, the controlling part 150 has, as logical processing blocks generated in the CPU 150a, the lock-in detecting part 151 that is one specific example of the "detecting device" and a signal processing part 152.

The lock-in detecting part 151 is configured to execute a synchronous detection on the voltage signal outputted from the I-V converting part 142 by using the bias voltage generated by the bias voltage generating part 141 as a reference signal. As a result, the lock-in detecting part 151 detects a sampled value of the terahertz wave THz. Same operation is repeated while adjusting the difference between the length of the light path of the pump light LB1 and the length of the light path of the probe light LB2 (namely, the light path length difference), and as a result, the lock-in detecting part 151 detects the waveform (a temporal waveform) of the terahertz wave THz detected by the terahertz wave detecting element 130. The lock-in detecting part 151 outputs, to the signal processing part 152, a detected waveform DW (namely, a waveform signal representing the detected waveform DW as a waveform information) that is the waveform of the terahertz wave THz detected by the terahertz wave detecting element 130. Namely, the lock-in detecting part 151 eliminates, from the voltage signal outputted from the I-V converting part 142, a noise component having a frequency that is different from that of the reference signal. Namely, the lock-in detecting part 151 detects the detected waveform DW with a relatively high sensitivity and relatively high accuracy by executing the synchronous detection on the basis of the reference signal and the voltage signal outputted from the I-V converting part 142. Note that a DC voltage may be applied to the terahertz wave generating element 110 as the bias voltage when the terahertz wave inspection apparatus 100 does not use a lock-in detection.

Figure 2A:
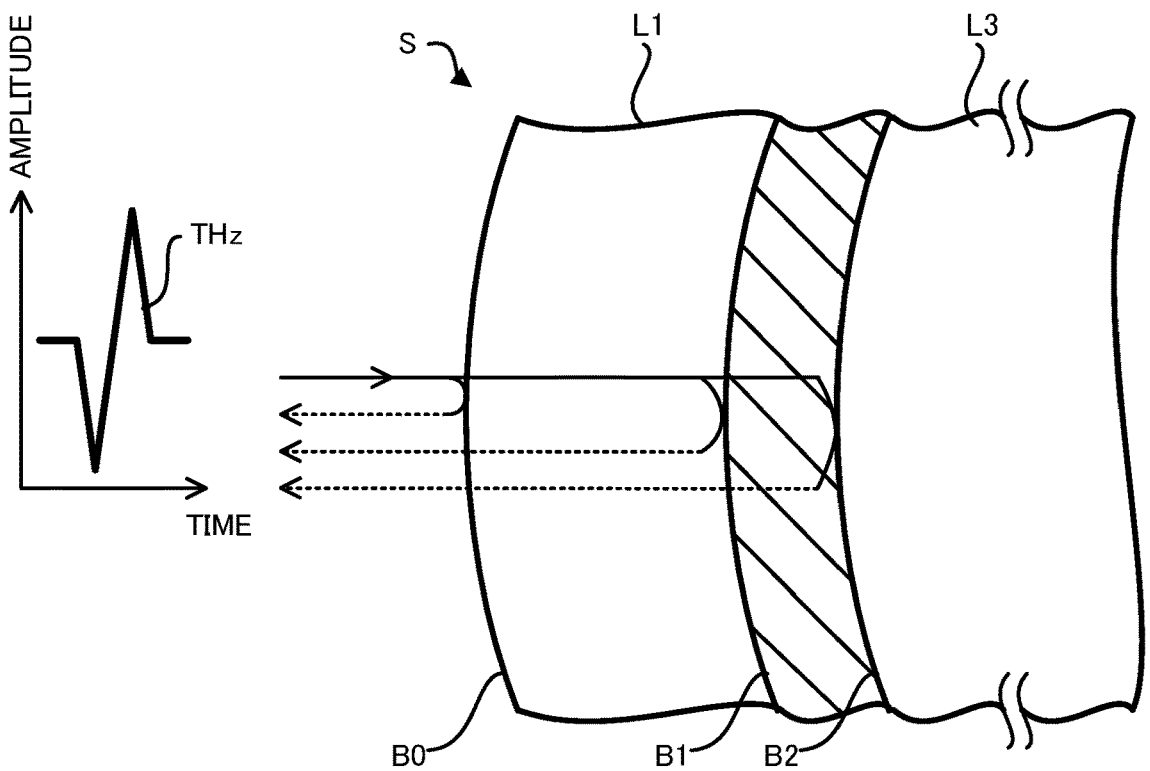
FIG. 2A is a cross-sectional diagram of a sample that illustrates an optical path of a terahertz wave irradiated to the sample and an optical path of the terahertz wave reflected by the sample.

Here, with reference to FIG. 2A to FIG. 2B, the detected waveform DW will be described. As illustrated in FIG. 2A, the terahertz wave THz generated by the terahertz wave generating element 110 is irradiated to the outer surface B0 of the sample S. One portion of the terahertz wave THz irradiated to the outer surface B0 is reflected by the outer surface B0. The terahertz wave THz reflected by the outer surface B0 propagates from the sample S to the terahertz wave detecting element 130. One portion of the terahertz wave THz irradiated to the outer surface B0 passes through the outer surface B0 without being reflected by the outer surface B0. The terahertz wave THz passing through the outer surface B0 passes through the inside of the sample S. Then, one portion of the terahertz wave THz passing through the outer surface B0 is reflected by the boundary surface B1 and another one portion of the terahertz wave THz passing through the outer surface B0 passes through the boundary surface B1. One portion of the terahertz wave THz passing through the boundary surface B1 is reflected by the boundary surface B2 and another one portion of the terahertz wave THz passing through the boundary surface B1 passes through the boundary surface B2. Thus, each of the terahertz wave THz reflected by the boundary surface B1 and the terahertz wave THz reflected by the boundary surface B2 also propagates from the sample S to the terahertz wave detecting element 130.

Figure 2B:
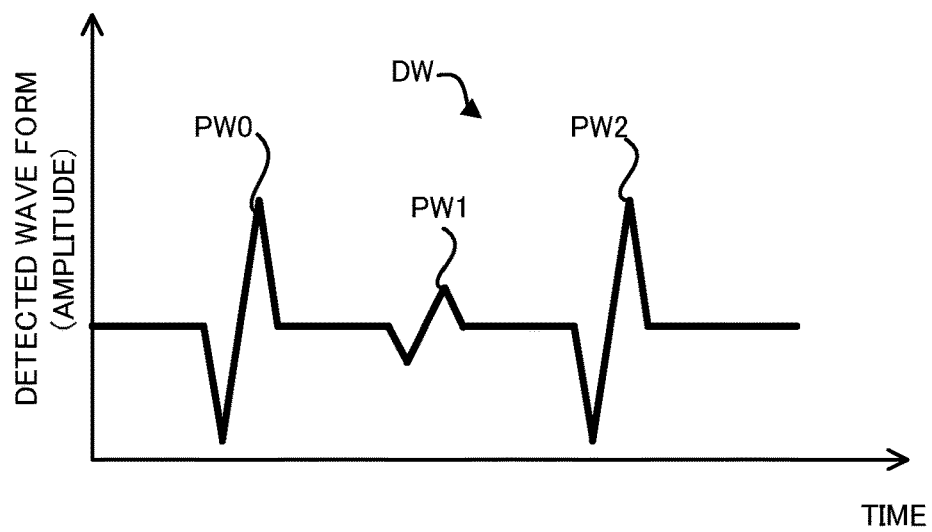
FIG. 2B is a waveform diagram that illustrates a detected waveform.

As a result, as illustrated in FIG. 2B, a pulse wave PW0 corresponding to the terahertz wave THz reflected by the outer surface B0, a pulse wave PW1 corresponding to the terahertz wave THz reflected by the boundary surface B1 and a pulse wave PW2 corresponding to the terahertz wave THz reflected by the boundary surface B2 appear in the detected waveform DW Again in FIG. 1, the signal processing part 152 is configured to estimate the characteristics of the sample S on the basis of the detected waveform DW outputted from the lock-in detecting part 151. For example, the signal processing part 152 is configured to obtain a frequency spectrum of the terahertz wave THz by using a terahertz time domain spectroscopy and to estimate the characteristics of the sample S on the basis of the frequency spectrum.

Especially in the present example, the signal processing part 152 is configured to execute, as one example of the control operation, an estimation operation for estimating the position of the boundary surface B on the basis of the detected waveform DW. In order to execute the estimation operation, the signal processing part 152 has, as logical processing blocks generated in the CPU 150a, a library generating part 1521 that is one specific example of each of the "generating device" and the "library generation apparatus" and a position estimating part 1522 that is one specific example of the "estimating device". Note that the specific example of the operation of each of the library generating part 1521 and the position estimating part 1522 will be described later in detail and thus its description is omitted here.

(2) Estimation Operation for Estimating Position of Boundary Surface B Executed by Terahertz Wave Inspection Apparatus 100

Figure 3:
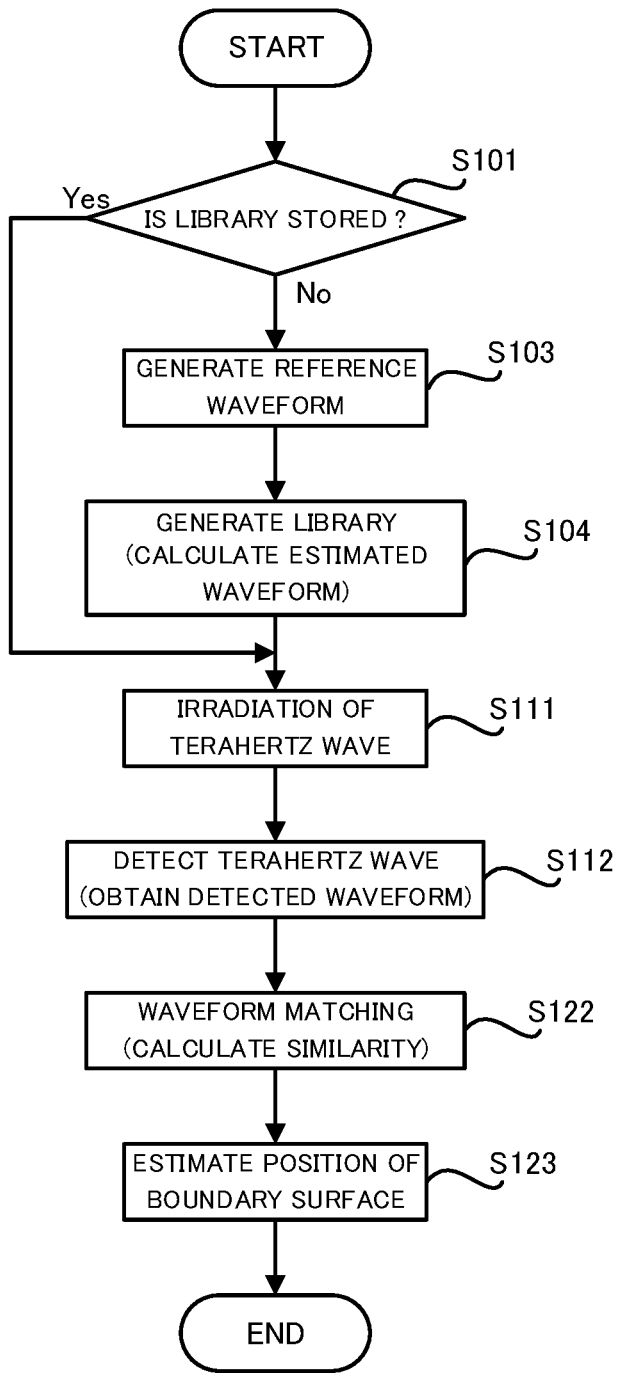
FIG. 3 is a flowchart that illustrates one example of a flow of an estimation operation for estimating a position of a boundary surface executed by the terahertz wave inspection apparatus in the present example.

Next, with reference to FIG. 3, the estimating operation for estimating the position of the boundary surface B executed by the terahertz wave inspection apparatus 100 will be described. FIG. 3 is a flowchart that illustrates one example of a flow of the estimating operation for estimating the position of the boundary surface B executed by the terahertz wave inspection apparatus 100.

As illustrated in FIG. 3, firstly, the library generating part 1521 determines whether or not a library 1521a that is used to estimate the position of the boundary surface B1 and that is unique to the sample S is stored in the memory 150b of the controlling part 150 (alternatively, any recording medium) (a step S101). Specifically, the library generating part 1521 determines whether or not the library 1521*a* previously generated by the library generating part 1521 for the sample S is stored in the memory 150*b*.

Here, with reference to FIG. 4, the library 1521*a* will be described. The library 1521*a* stores the waveform of the terahertz wave THz that is estimated to be detected by the terahertz wave detecting element 130 when the terahertz wave THz is irradiated to the sample S (namely, a result of the estimation of the detected waveform DW). Hereinafter, the waveform of the terahertz wave THz included in the library 1521*a* is referred to as an "estimated waveform EW". Especially, the library 1521*a* stores the estimated waveform EW with the estimated waveform EW being associated with expected candidate position of the boundary surface B1 in the sample S. Namely, the library 1521*a* stores, for each of the plurality of candidate positions, a plurality of waveforms (namely, the estimated waveforms EW) of the terahertz waves THz each of which is estimated to be detected by the terahertz wave detecting element 130 when the terahertz wave THz is irradiated to the sample S in which the boundary surface B is at a certain candidate position.

Note that the position of the boundary surface B1 varies depending on a thickness of the layer L1 and a thickness of the layer L2. Thus, in the present example, the library 1521*a* stores the estimated waveform EW with the estimated waveform EW being associated with an expected candidate of the thickness of each of the layers L1 and L2 in the sample S. Namely, the library 1521*a* stores, for each of the plurality of candidate thicknesses, a plurality of waveforms (namely, the estimated waveforms EW) of the terahertz waves THz each of which is estimated to be detected by the terahertz wave detecting element 130 when the terahertz wave THz is irradiated to the sample S in which each of the layers L1 and L2 has a certain thickness.

Figure 4:
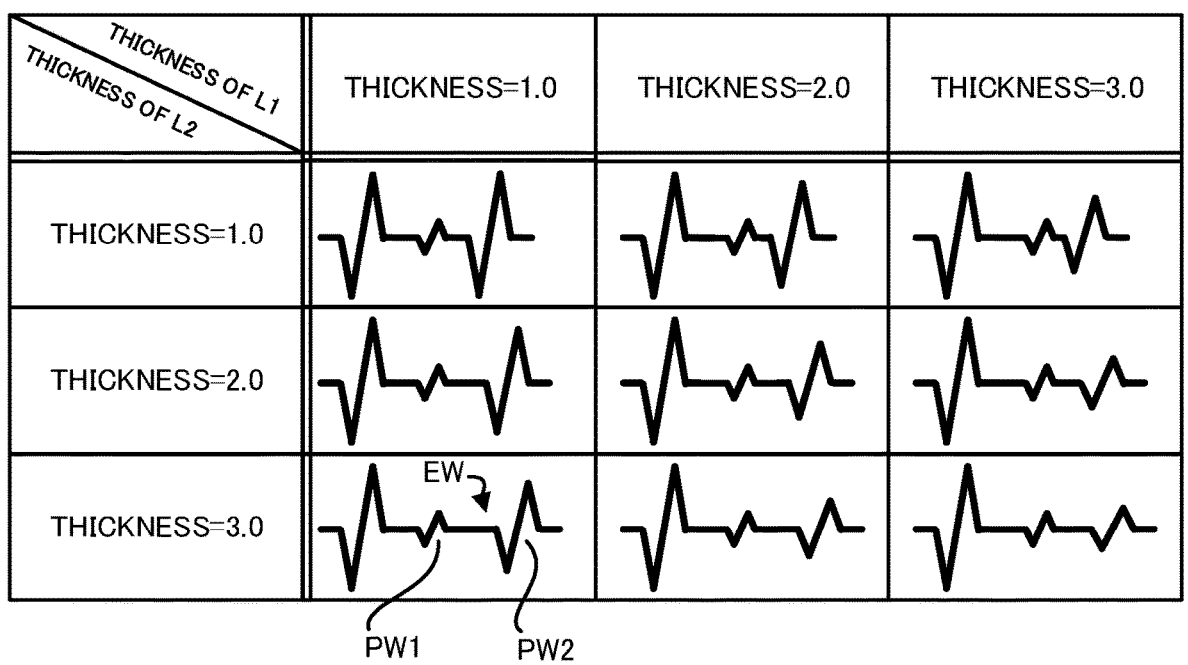
FIG. 4 is a table that illustrates a library indicating a correspondence relationship between a candidate position of the boundary surface and an estimated waveform.

For example, in an example illustrated in FIG. 4, the library 1521*a* stores (i) the estimated waveform EW corresponding to the sample S in which the thicknesses of the layers L1 and L2 are 1.0 and 1.0, respectively, (ii) the estimated waveform EW corresponding to the sample S in which the thicknesses of the layers L1 and L2 are 1.0 and 2.0, respectively, (iii) the estimated waveform EW corresponding to the sample S in which the thicknesses of the layers L1 and L2 are 1.0 and 3.0, respectively, (iv) the estimated waveform EW corresponding to the sample S in which the thicknesses of the layers L1 and L2 are 2.0 and 1.0, respectively, (v) the estimated waveform EW corresponding to the sample S in which the thicknesses of the layers L1 and L2 are 2.0 and 2.0, respectively, (vi) the estimated waveform EW corresponding to the sample S in which the thicknesses of the layers L1 and L2 are 2.0 and 3.0, respectively, (vii) the estimated waveform EW corresponding to the sample S in which the thicknesses of the layers L1 and L2 are 3.0 and 1.0, respectively, (viii) the estimated waveform EW corresponding to the sample S in which the thicknesses of the layers L1 and L2 are 3.0 and 2.0, respectively and (ix) the estimated waveform EW corresponding to the sample S in which the thicknesses of the layers L1 and L2 are 3.0 and 3.0, respectively. As can be seen by FIG. 4, when the candidate position of the boundary surface B1 is changed due to the change of the thickness of the layer L1, the position of the pulse wave PW1 corresponding to the boundary surface B1 is also changed in the estimated wave form EW. Similarly, when the candidate position of the boundary surface B2 is changed due to the change of the thickness of at least one of the layers L1 and L2, the position of the pulse wave PW2 corresponding to the boundary surface B2 is also changed in the estimated wave form EW.

Again in FIG. 3, as a result of the determination at the step S101, when it is determined that the library 1521*a* is stored in the memory 150*b* (the step S101: Yes), the library generating part 1521 does not newly generate the library 1521*a*. Thus, the controlling part 150 estimates the positions of the boundary surface B1 by using the existing library 1521*a* stored in the memory 150*b*.

On the other hand, as a result of the determination at the step S101, when it is determined that the library 1521*a* is not stored in the memory 150*b* (the step S101: No), the library generating part 1521 newly generates the library 1521*a* (a step S103 to a step S104).

Figure 5:
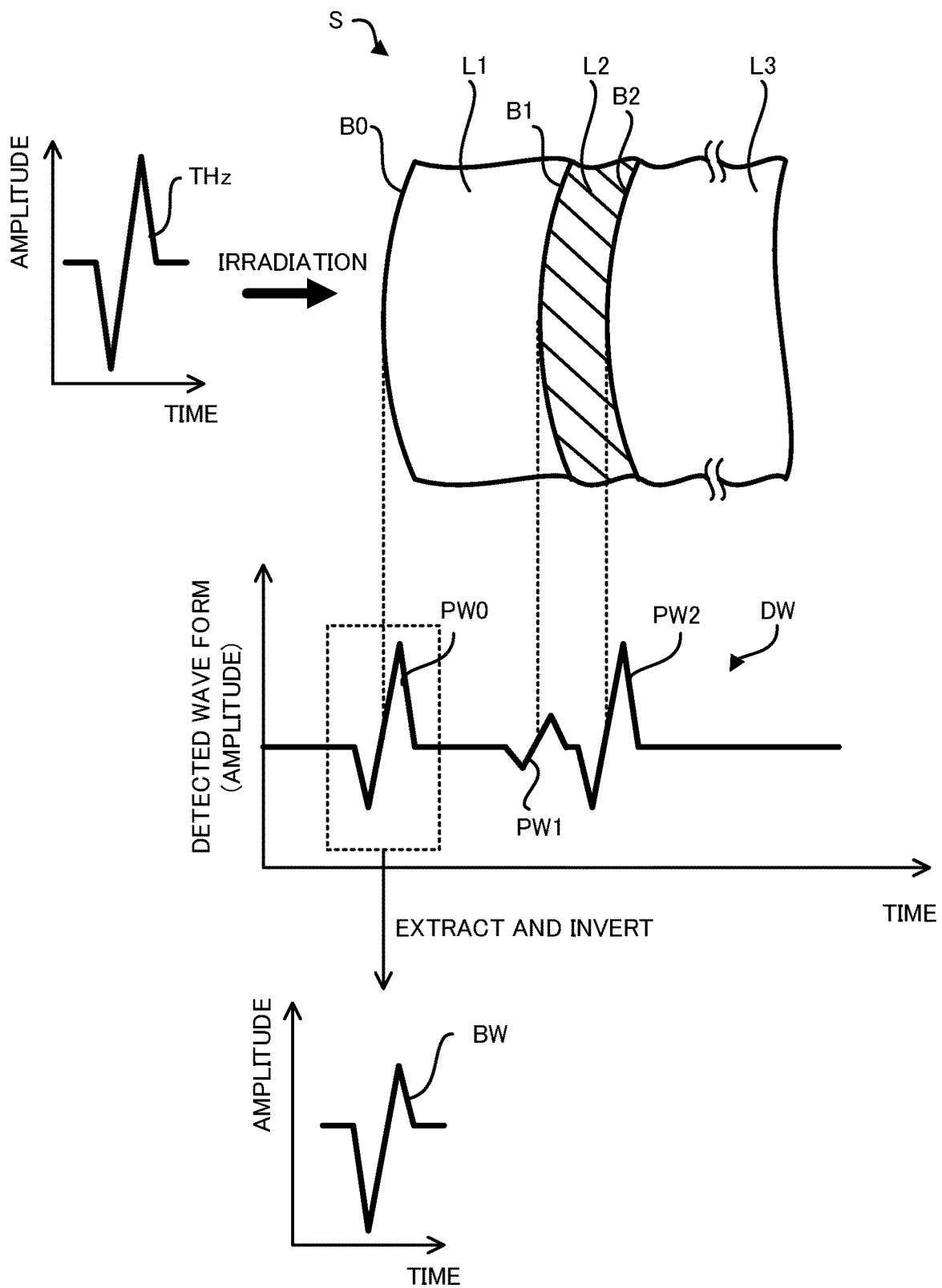
FIG. 5 is a waveform diagram that illustrates an operation of generating a reference waveform.

Specifically, firstly, the library generating part 1521 generates a reference waveform BW for the sample S that is a target of the inspection (a step S103). The reference waveform BW is the waveform of the terahertz wave THz that is used as a standard to generate the library 1521*a*. Specifically, as illustrated in an upper waveform diagram in FIG. 5, the pulsed terahertz wave THz is irradiated to the sample S under the control of the library generating part 1521. As a result, as illustrated in a middle waveform diagram in FIG. 5, the detected waveform DW is obtained. Then, the library generating part 1521 extract the pulse wave PW0 corresponding to the outer surface B0 from the detected waveform DW. For example, the library generating part 1521 extracts the pulse wave PW0 by executing an operation using a window function (for example, a window function based on a gauss window, a hamming window or the like) that is set to exclude the pulse waves PW1 and PW2 to extract the pulse wave PW0 on the detected waveform DW. Then, as illustrated in a lower waveform diagram in FIG. 5, the library generating part 1521 inverts the extracted pulse wave PW0 (specifically, inverts it along both of a time axis direction and an amplitude axis direction). The waveform obtained by inverting the pulse wave PW0 is used as the reference waveform BW. Namely, in the present example, the library generating part 1521 generates the reference waveform BW from the detected waveform DW that is obtained by irradiating the sample S itself that is the target of the inspection with the terahertz wave THz.

However, when the reference waveform BW for the sample S that is a target of the inspection is already generated (for example, a reference waveform information indicating the reference waveform BW that is already generated is stored in the memory 150*b*), the library generating part 1521 may generate the library 1521*a* by using the reference waveform BW that is already generated without newly generating the reference waveform BW.

Then, the library generating part 1521 generates the library 1521*a* by using the reference waveform BW (the step S104). Specifically, firstly, the library generating part 1521 sets, on a simulation model that simulates the sample S, physicality (for example, a permittivity, a magnetic permeability, an attenuation rate, an electrical conductivity and the like) of each of the layers L1 to L3 to an actually measured value that is obtained by actually measuring the physicality of each of the layers L1 to L3 in advance. Then, the library generating part 1521 calculates the estimated waveform EW by estimating, on the simulation model, a propagating aspect of the terahertz wave THz when the terahertz wave THz based on the reference waveform BW is irradiated to the sample S. The library generating part 1521 repeats an operation of calculating the estimated waveform EW while changing the position of the boundary surface B1 (namely, the thickness of each of the layers L1 and L2). As a result, the library 1521a including the plurality of estimated waveforms EW is generated. Note that the library generating part 1521 may use an existing method for simulating the waveform of the electromagnetic wave as a method of calculating the estimated waveform EW. A FDTD (Finite Difference Time Domain) method or an ADE-FDTD (Auxiliary Differential Equation FDTD) method is one example of the existing method.

Then, the terahertz wave generating element 110 emits the terahertz wave THz to the outer surface B0 of the sample S (a step S111). As a result, the terahertz wave detecting element 130 detects the terahertz wave THz reflected by the sample S (a step S112). Namely, the signal processing part 152 obtains the detected waveform DW (the step S112).

Then, the position estimating part 1522 executes a matching between the detected waveform DW obtained at the step S112 and the estimated waveforms EW included in the library 1521a (a step S122). Namely, the position estimating part 1522 compares the detected waveform DW obtained at the step S112 with the estimated waveforms EW included in the library 1521a. Specifically, the position estimating part 1522 calculates a similarity degree (a degree of a similarity) R between the detected waveform DW and the estimated waveform EW. Note that the similarity degree R is an index that represents how similar the detected waveform DW and the estimated waveform EW are with each other. Thus, the similarity degree R is an index that becomes larger as the detected waveform DW and the estimated waveform EW are more similar with each other. Namely, the similarity degree R is substantially same as a correlated function between the detected waveform DW and the estimated waveform EW.

The position estimating part 1522 may calculate the similarity degree R by using an existing method of calculating the similarity degree between two signal waveforms. The following equations 1 and 2 are one examples of the existing method. Note that a "$u_d(t)$" represents the amplitude of the detected waveform DW at a time t (note that the time t is a time included in an above described comparison target range WR), a "$u_e(t)$" represents the amplitude of the estimated waveform EW at the time t, a "$\mu_d$" represents an average value (what we call a DC component) of the amplitude of the detected waveform DW and a "$\mu_e$" represents an average value (what we call a DC component) of the amplitude of the estimated waveform EW in the equation 1 and the equation 2.

$$R = \frac{\sum (u_d(t) - \mu_d)(u_e(t) - \mu_e)}{\sqrt{\sum (u_d(t) - \mu_d)^2} \sqrt{\sum (u_e(t) - \mu_e)^2}} \quad \text{Equation 1}$$

$$R = \sum (u_d(t) - u_e(t))^2 \quad \text{Equation 2}$$

The position estimating part 1522 executes the operation of calculating the similarity degree R with respect to the plurality of estimated waveforms EW (alternatively, one portion thereof) stored in the library 1521a, repeatedly. As a result, a plurality of similarity degrees R that correspond to the plurality of estimated waveforms EW are calculated.

Then, the position estimating part 1522 estimates the position of the boundary surface B1 on the basis of the plurality of similarity degrees R calculated at the step S122 (a step S123). Specifically, the position estimating part 1522 determines the estimated waveform EW corresponding to the maximum similarity degree R among the plurality of similarity degrees R. The position estimating part 1522 estimates that the position of the boundary surface B1 corresponding to the determined estimated waveform EW is the actual position of the boundary surface B1.

(4) Technical Effect of Terahertz Wave Inspection Apparatus 100

As described above, the terahertz wave inspection apparatus 100 in the present example is capable of properly estimating the position of the boundary surface B1 (namely, the position of the boundary surface B in the sample S).

Moreover, the terahertz wave inspection apparatus 100 generates the reference waveform BW from the detection waveform DW that is obtained by irradiating the sample S itself that is the target of the inspection with the terahertz wave THz. Thus, the terahertz wave inspection apparatus 100 is capable of estimating the position of the boundary surface B1 with a higher accuracy, compared to a terahertz wave inspection apparatus in a comparison example that generates the reference waveform BW on the basis of the detection waveform DW that is obtained by irradiating a reference plate P different from the sample S with the terahertz wave THz. Next, its reason will be described with reference to FIG. 6A to FIG. 6B and FIG. 7A to FIG. 7B.

Figure 6A:
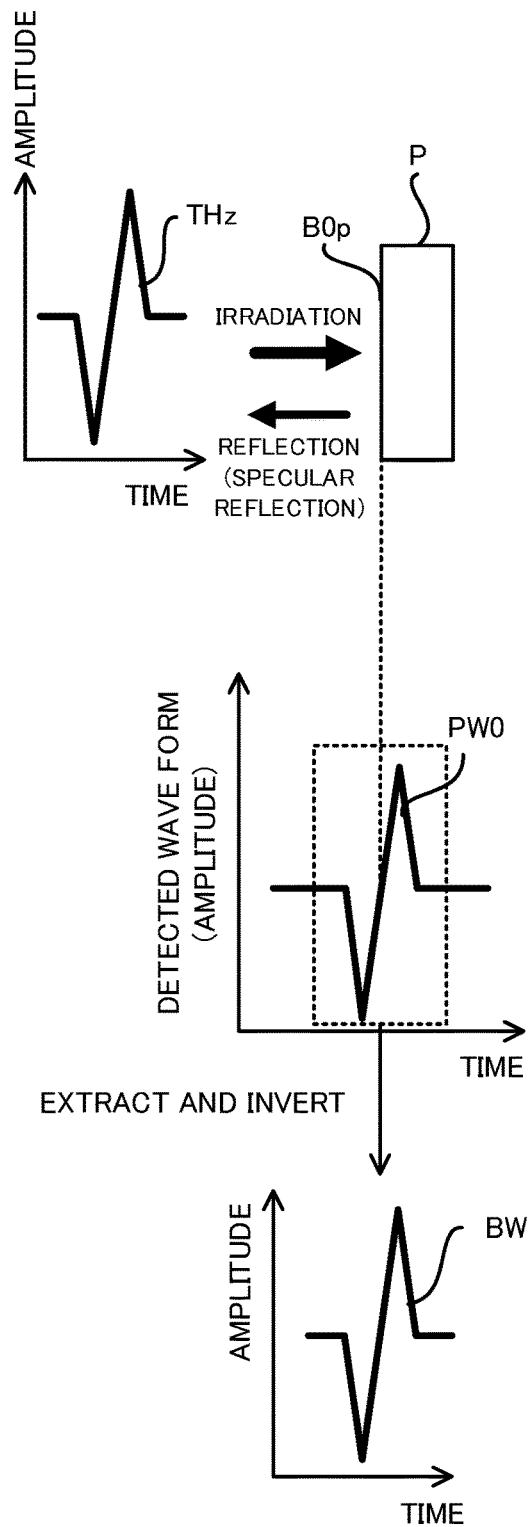
FIG. 6A is a waveform diagram that illustrates an operation of generating the reference waveform on the basis of the detected waveform of the terahertz wave that is irradiated to a reference plate different from the sample.
Figure 6B:
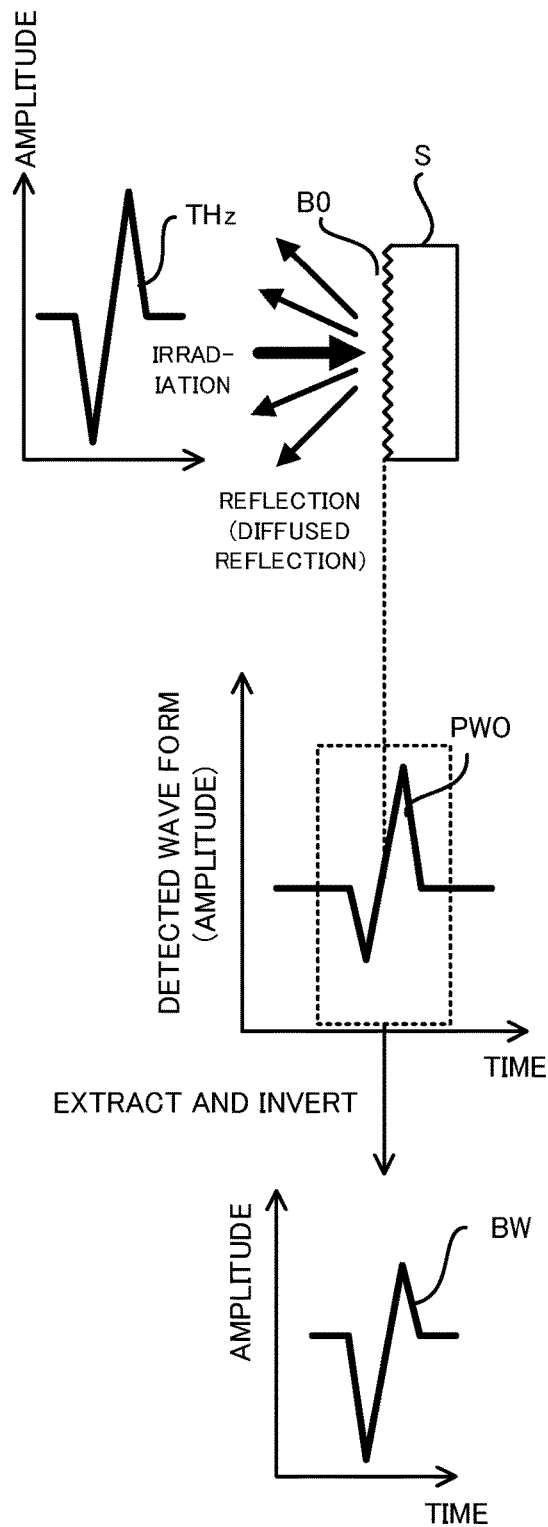
FIG. 6B is a waveform diagram that illustrates an operation of generating the reference waveform on the basis of the detected waveform of the terahertz wave that is irradiated to the sample.

FIG. 6A is a waveform diagram that illustrates an operation of generating the reference waveform BW on the basis of the detected waveform DW of the terahertz wave THz that is irradiated to the reference plate P that is different from the sample S. On the other hand, FIG. 6B is a waveform diagram that illustrates an operation of generating the reference waveform BW on the basis of the detected waveform DW of the terahertz wave THz that is irradiated to the sample S. Since the reference plate P is different from the sample S, a behavior (in other words, a response or an action) of the terahertz wave THz to an outer surface B0p of the reference plate P is different from a behavior of the terahertz wave THz to the outer surface B0 of the sample S. For example, when the reference plate P is different from the sample S, a structure of the outer surface B0p of the reference plate P is different from a structure of the outer surface B0 of the sample S. Specifically, for example, an upper waveform diagram in FIG. 6A and an upper wave form diagram in FIG. 6B illustrate an example in which the outer surface B0 of the sample S has a relatively non-flat (namely, rough) structure although the outer surface B0p of the reference plate P has a relatively flat structure. In this case, the terahertz wave THz is specularly reflected by the outer surface B0 of the sample S although the terahertz wave THz is diffused and reflected by the outer surface B0p of the reference plate P. Thus, as illustrated in a middle waveform diagram in FIG. 6A and a middle wave form diagram in FIG. 6B, there is a possibility that the detected waveform DW of the terahertz wave THz irradiated to the reference plate P is greatly different from the detected waveform DW of the terahertz wave THz irradiated to the sample S. As a result, as illustrated in a lower waveform diagram in FIG. 6A and a lower wave form diagram in FIG. 6B, there is a possibility that the reference waveform BW that is generated from the detected waveform DW of the terahertz wave THz irradiated to the reference plate P is greatly different from the reference waveform BW that is generated from the detected waveform DW of the terahertz wave THz irradiated to the sample S. This is because there is such a difference that an influence from the sample S to the terahertz wave THz when the terahertz wave THz is actually reflected by the sample S is added to the reference waveform BW that is generated from the detected waveform DW of the terahertz wave THz irradiated to the sample S although the influence from the sample S to the terahertz wave THz when the terahertz wave THz is actually reflected by the sample S is not added to the reference waveform BW that is generated from the detected waveform DW of the terahertz wave THz irradiated to the reference plate P.

Thus, in a comparison example in which the reference waveform BW is generated without considering the influence from the sample S to the terahertz wave THz when the terahertz wave THz is actually reflected by the sample S, there is a possibility that the estimated waveform EW (see FIG. 7A) generated this reference waveform BW is greatly different from the detected waveform DW (see FIG. 7C) that is actually obtained by irradiating the sample S with the terahertz wave THz. On the other hand, in the present example in which the reference waveform BW is generated by considering the influence from the sample S to the terahertz wave THz when the terahertz wave THz is actually reflected by the sample S, the estimated waveform EW (see FIG. 7B) generated this reference waveform BW is not greatly different from the detected waveform DW (see FIG. 7C) that is actually obtained by irradiating the sample S with the terahertz wave THz. Namely, an accuracy (in other words, a similarity or a trueness to the actual detected waveform DW) of the generated estimated waveform EW is improved by the terahertz wave inspection apparatus 100, compared to the terahertz wave inspection apparatus in the comparison example. Thus, an estimation accuracy of the position of the boundary surface B based on the estimated waveform EW is also improved by the terahertz wave inspection apparatus 100, compared to the terahertz wave inspection apparatus in the comparison example. Therefore, the terahertz wave inspection apparatus 100 is capable of properly estimating the position of the boundary surface of the plurality of layers.

Note that even the terahertz wave inspection apparatus in the comparison example is capable of preventing an deterioration of the accuracy of the estimated waveform EW if the propagating aspect of the terahertz wave THz is estimated two-dimensionally or three-dimensionally by using a simulation model considering a two-dimensional shape or a three-dimensional shape of the sample S (namely, the propagating aspect of the terahertz wave THz is estimated by considering the above described influence of the diffused reflection and the like at the outer surface B0 of the sample S). However, in this case, a calculation cost necessary for forming the simulation model is relatively large and a calculation cost necessary for estimating the propagating aspect of the terahertz wave THz by using this simulation model. On the other hand, the present example has a large advantage in that an increase of the calculation cost necessary for forming the simulation model is suppressed and the accuracy of the estimated waveform EW improves.

(5) Modified Example (5-1) First Modified Example

In the above described description, the library generating part 1521 generates the reference waveform BW from the detected waveform DW obtained by irradiating the terahertz wave THz to the sample S itself that is the inspection target. However, the library generating part 1521 may generate the reference waveform BW from the detected waveform DW obtained by irradiating the terahertz wave THz to a sample member SP that is different not the sample S itself and that has specifications that are same as those of that is the inspection target.

Specifically, in a first modified example, when it is determined that the library 1521*a* is not stored in the memory 150*b* (the step S101: No), the sample member SP is loaded to the terahertz wave inspection apparatus 100 instead of the sample S. Then, the pulsed terahertz wave THz is irradiated to the sample member SP, the detected waveform DW is obtained, the pulse wave PW0 corresponding to the outer surface B0 is extracted from the detected waveform DW, and the waveform that is obtained by inverting the extracted pulse wave PW0 is generated as the reference waveform BW (the step S103 in FIG. 3). Then, the estimated waveform (namely, the library 1521*a* is generated by using the reference waveform BW (the step S104 in FIG. 3). Then, the sample member SP is unloaded from the terahertz wave inspection apparatus 100 and the sample S is loaded to the terahertz wave inspection apparatus 100. Then, the position of the boundary surface of the sample S is estimated (the step S111 to the step S123 in FIG. 3).

Figure 8A:
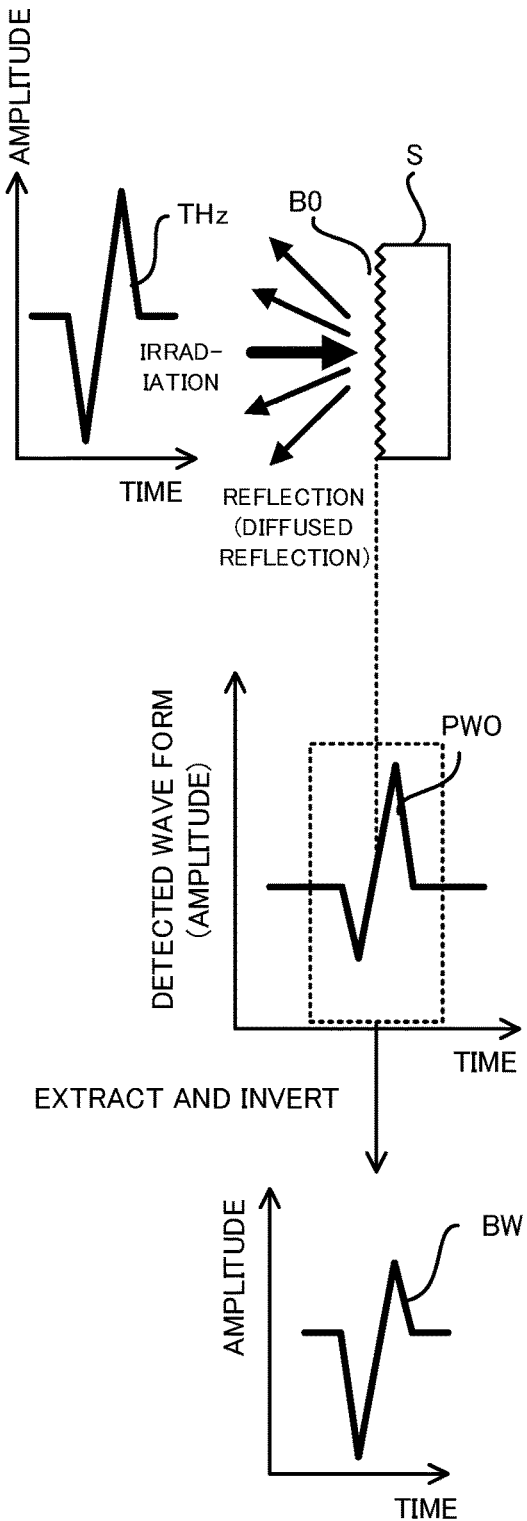
FIG. 8A is a waveform diagram that illustrates an operation of generating the reference waveform on the basis of the detected waveform of the terahertz wave that is irradiated to the sample.
Figure 8B:
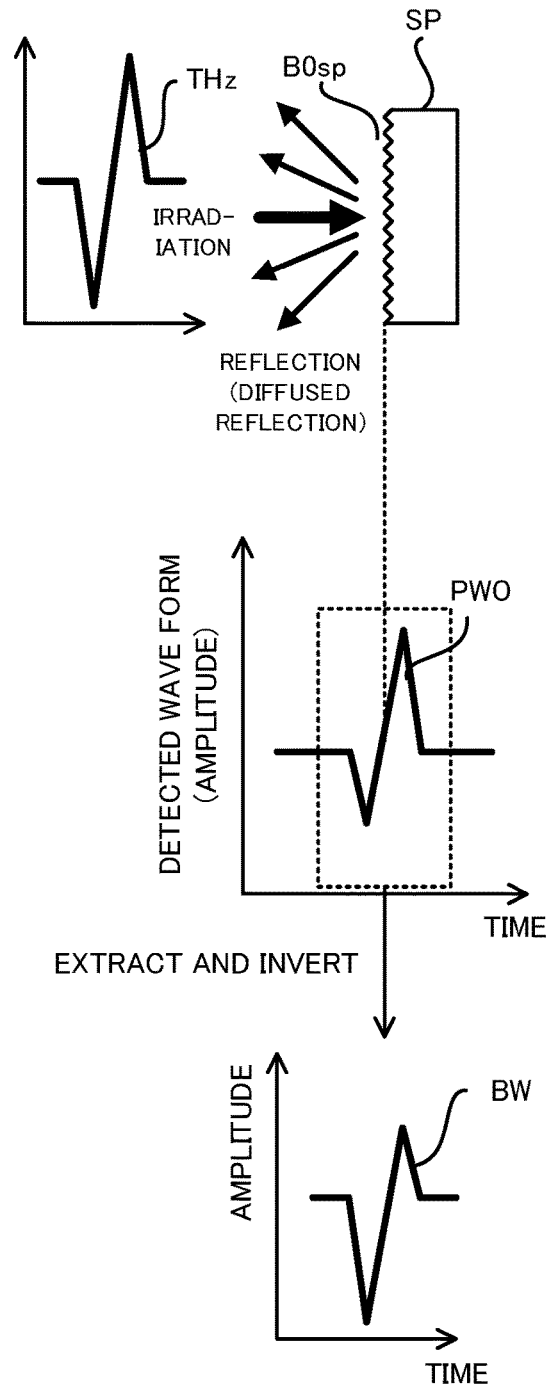
FIG. 8B is a waveform diagram that illustrates an operation of generating the reference waveform on the basis of the detected waveform of the terahertz wave that is irradiated to the reference plate.

Since the specifications of the sample member SP are same as the specifications of the sample S, the behavior (in other words, the response or the action) of the terahertz wave THz to an outer surface B0*sp* of the sample member SP is same as the behavior of the terahertz wave THz to the outer surface B0 of the sample S. For example, when the specifications of the sample member SP are same as the specifications of the sample S, a structure of the outer surface B0*sp* of the sample member SP is same as the structure of the outer surface B0 of the sample S. Specifically, for example, when the outer surface B0 of the sample S has the relatively non-flat structure as illustrated in FIG. 8A, the outer surface of the sample member SP also has the relatively non-flat structure as illustrated in FIG. 8B. Thus, as illustrated in a middle waveform diagram in FIG. 8A and a middle wave form diagram in FIG. 8B, the detected waveform DW of the terahertz wave THz irradiated to the sample member SP is not greatly different from the detected waveform DW of the terahertz wave THz irradiated to the sample S. As a result, as illustrated in a lower waveform diagram in FIG. 8A and a lower wave form diagram in FIG. 8B, the reference waveform BW that is generated from the detected waveform DW of the terahertz wave THz irradiated to the sample member SP is not greatly different from the reference waveform BW that is generated from the detected waveform DW of the terahertz wave THz irradiated to the sample S.

Thus, even in the first modified example, there is small possibility that the estimated waveform EW generated this reference waveform BW is greatly different from the detected waveform DW of the terahertz wave THz irradiated to the sample S, as with the above described example. Namely, the accuracy of the generated estimated waveform EW is improved in the first modified example, as with the above described example. Thus, the estimation accuracy of the position of the boundary surface B based on the estimated waveform EW is also improved.

The reason why the estimation accuracy of the position of the boundary surface B is improved even when the reference waveform BW that is generated from the detected waveform DW of the terahertz wave TH irradiated to the sample member SP is used is that the influence from the sample S to the terahertz wave THz when the terahertz wave THz is actually reflected by the sample S is substantially added to the reference waveform BW that is generated from the detected waveform DW of the terahertz wave THz irradiated to the sample member SP, as with the reference waveform BW that is generated from the detected waveform DW of the terahertz wave THz irradiated to the sample S. In this case, it can be said that a state where "the specifications of the sample member SP are same as the specifications of the sample S" is substantially equivalent to a state where the behavior of the terahertz wave THz to the outer surface B0$sp$ of the sample member SP is same as the behavior of the terahertz wave THz to the outer surface B0 of the sample S. In other words, the state where "the specifications of the sample member SP are same as the specifications of the sample S" includes not only a state where the specifications of the sample member SP are exactly same as the specifications of the sample S literally but also a state where there is allowed to be a difference in the specifications between the sample S and the sample member SP that is slight difference to allow the behavior of the terahertz wave THz to the outer surface B0$sp$ of the sample member SP to be regarded to be substantially same as the behavior of the terahertz wave THz to the outer surface B0 of the sample S.

When a structure, a shape, a material, a size and optical characteristics to the terahertz wave THz of the sample S are same as a structure, a shape, a material, a size and optical characteristics to the terahertz wave THz of the sample member SP, there is a high possibility that the behavior of the terahertz wave THz to the outer surface B0$sp$ of the sample member SP is same as (alternatively, is regarded to be substantially same as) the behavior of the terahertz wave THz to the outer surface B0 of the sample S. Thus, it is preferable that the "specifications" in the first modified example include the structure, the shape, the material, the size and the optical characteristics to the terahertz wave THz. However, it is obvious from the above described description that there is allowed to be a difference in the structure between the sample S and the sample member SP that is slight difference to allow the behavior of the terahertz wave THz to the outer surface B0$sp$ of the sample member SP to be regarded to be substantially same as the behavior of the terahertz wave THz to the outer surface B0 of the sample S. The same applies to the shape, the material, the size and the terahertz wave THz.

In addition, the reference waveform BW is generated from the detected waveform DW of the terahertz wave THz that is reflected by the outer surface B0$sp$ of the sample member SP. Thus, there is a high possibility that the behavior of the terahertz wave THz to the outer surface B0$sp$ of the sample member SP is substantially same as the behavior of the terahertz wave THz to the outer surface B0 of the sample S, when at least the specifications of the outer surface B0$sp$ of the sample member SP are same as the specifications of the outer surface B0 of the sample S. Thus, the state where "the specifications of the sample member SP are same as the specifications of the sample S" may mean a state where at least the specifications of the outer surface B0$sp$ of the sample member SP (alternatively, an outermost layer of the sample member SP) are same as the specifications of the outer surface B0 of the sample S (alternatively, an outermost layer of the sample S). However, it is preferable that the state where "the specifications of the sample member SP are same as the specifications of the sample S" mean a state where an inner structure (especially, a laminated structure) of the sample member SP is same as an inner structure of the sample S, because there is a possibility that the inner structure of the sample member SP affects the detect waveform DW.

(5-2) Second Modified Example

Figure 9:
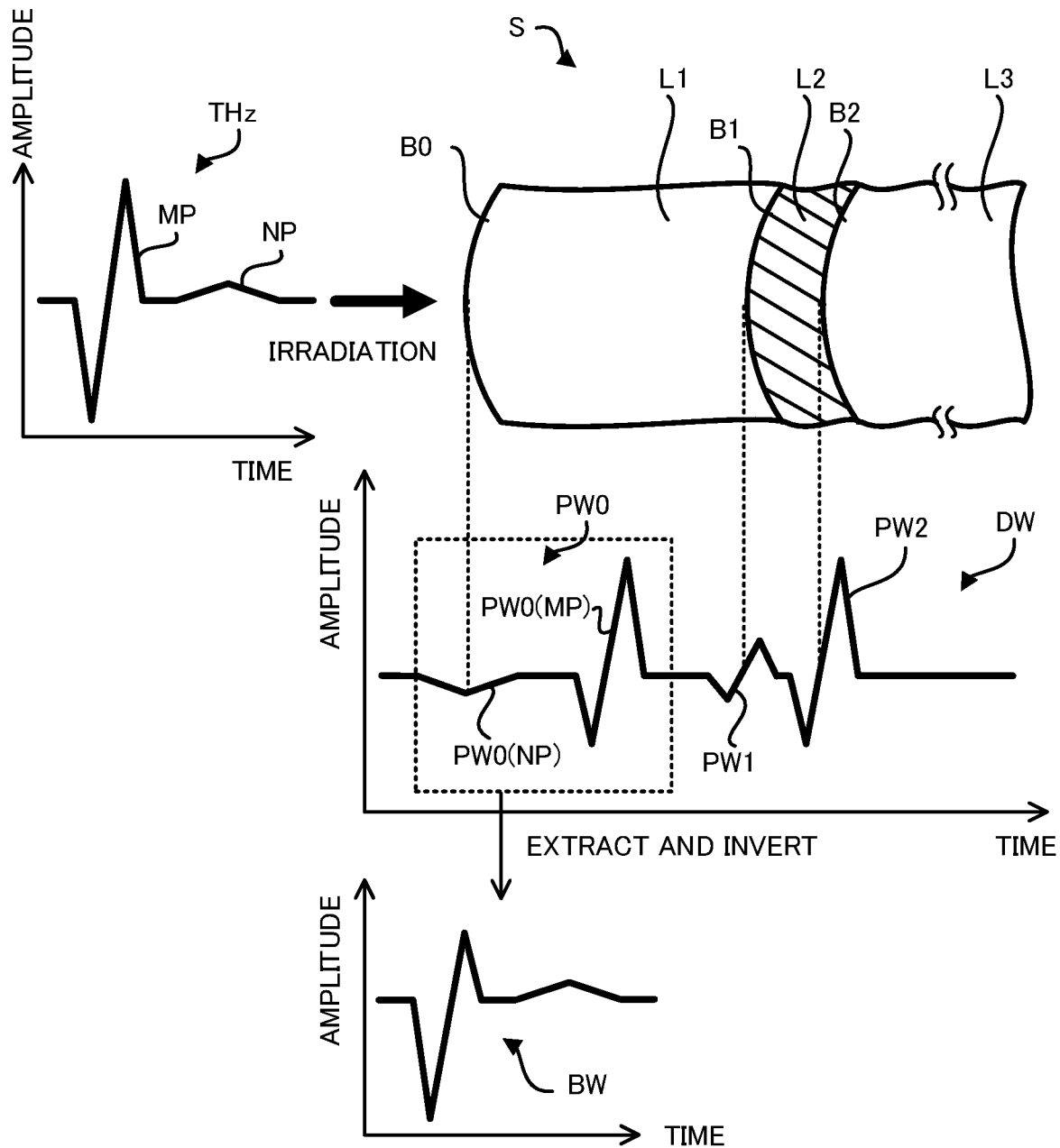
FIG. 9 is a waveform diagram that illustrates an operation of generating the reference waveform on the basis of the detected waveform of the terahertz wave including a main pulse and an accompanying pulse.

As illustrated in an upper waveform diagram in FIG. 9, the pulsed terahertz wave THz generated by the terahertz wave generating element 100 includes not only a main pulse MPO that should be originally generated (namely, that should be purposely generated) by the terahertz wave generating element 100 but also an accompanying pulse NP that is unintentionally generated by the terahertz wave generating element 100. The accompanying pulse NP is a pulse having a frequency that is lower than that of the main pulse MP. One example of the accompanying pulse NP includes a noise pulse that is difficult to be reduced to be zero due to characteristics of the terahertz wave generating element 100.

When the terahertz wave THz includes the main pulse MP and the accompanying pulse NP as described above, as illustrated in a middle waveform diagram in FIG. 9, a pulse wave PW0(MP) corresponding to a reflected wave of the main pulse MP from the outer surface B0 and a pulse wave PW0(NP) corresponding to a reflected wave of the accompanying pulse NP from the outer surface B0 appear in the detected waveform DW as the pulse wave PW0 corresponding to the outer surface B0. When the reference waveform BW is generated from this detected waveform DW, the library generating part 1521 may extract the pulse wave PW0 including both of the pulse wave PW0(MP) and the pulse wave PW0(NP) from the detected waveform DW, as illustrated in the middle waveform in FIG. 9. Then, the library generating part 1521 may generate the waveform that is obtained by inverting the extracted pulse wave PW0 as the reference waveform BW, as illustrated in a lower waveform diagram in FIG. 9.

As a result, in the second modified example, the library generating part 1521 is capable of generating the reference waveform BW in which the influence of the accompanying pulse NP that is actually generated by the terahertz wave generating element 100. Thus, the accuracy of the estimated waveform EW generated from this reference waveform BW is improved more. Thus, the estimation accuracy of the position of the boundary surface B based on the estimated waveform EW is also improved more.

However, even when the pulse wave PW0(MP) and the pulse wave PW0(NP) appear in the detected waveform DW, the library generating part 1521 may exclude the pulse wave PW0(NP) to extract the pulse wave PW0(MP) from the detected waveform DW. Even in this case, the fact remains that the reference waveform BW is generated from the detected waveform DW of the terahertz wave THz that is irradiated to the sample S itself that is the inspection target, and thus, the fact remains that the accuracy of the estimated waveform EW and the estimation accuracy of the position of the boundary surface B are improved more, compared to the comparison example.

Note that there is a possibility that the pulse wave PW0(NP) corresponding to the accompanying pulse NP becomes lost in the pulse wave corresponding to another boundary surface B other than the outer surface B0 when a distance between the outer surface B0 of the sample and the boundary surface B1 that appears next to the outer surface B0 is relatively small. Thus, when both of the pulse wave PW(MP) and the pulse wave PW(NP) are extracted from the detected waveform DW, it is preferable to use the sample S (alternatively, the sample member SP) in which the distance between the outer surface B0 and the boundary surface B1 is large enough to allow the pulse wave PW0(NP) corresponding to the accompanying pulse NP not to become lost in the pulse wave corresponding to another boundary surface B other than the outer surface B0.

(5-3) Third Modified Example

In the above described description, the position estimating part 1522 estimates the position of the boundary surface B1 by executing the matching between the detected waveform DW and the estimated waveform EW. However, the position estimating part 1522 estimates the positions of the boundary surfaces B1 and B2 by executing the matching between a waveform part of the detected waveform DW included in the comparison target range WR and a waveform part of the estimated waveform EW included in the comparison target range WR. In this case, the position estimating part 1522 sets the comparison target range WR before executing the matching between the detected waveform DW and the estimated waveform EW.

The position estimating part 1522 sets the comparison target range WR that is suitable to the detected waveform DW obtained at the step S112. Namely, the position estimating part 1522 sets the comparison target range WR that is varied depending on the detected waveform DW, instead of always setting same comparison target range WR regardless of the pulse wave PW included in the detected waveform DW obtained at the step S112. Therefore, it can be said that the position estimating part 1522 sets the comparison target range WR that is properly adjusted depending on the detected waveform DW. Note that the detected waveform DW varies depending on a state of the sample S. Thus, it can be said that the position estimating part 1522 substantially sets the comparison target range WR that is properly adjusted depending on the state of the sample S.

Figure 10A:
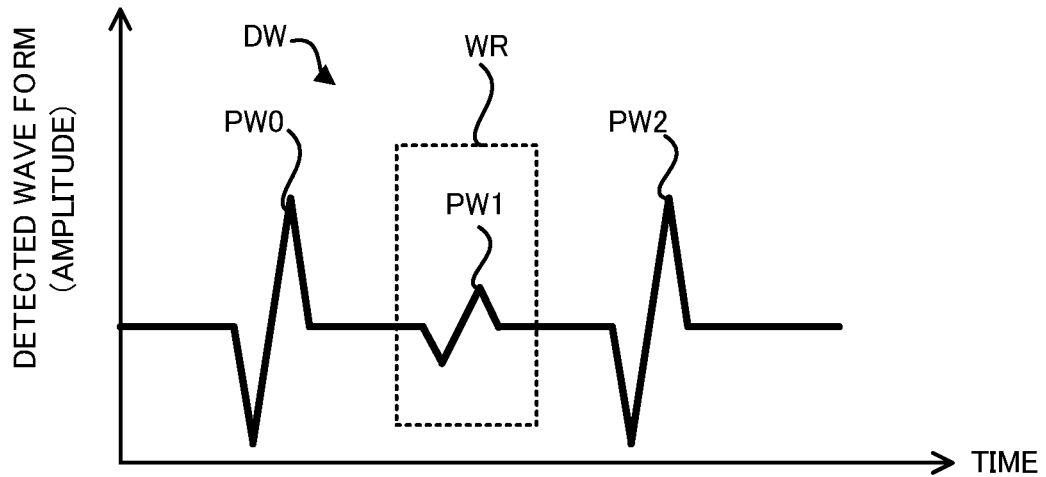
FIG. 10B is a waveform diagram that illustrates one example of a comparison target range in which a matching of the detected waveform and the estimated waveform should be executed.

The position estimating part 1522 sets the comparison target range WR that includes the pulse PW corresponding to the terahertz wave THz reflected by a target boundary surface B when the terahertz wave inspection apparatus 100 intends to estimate the position of the target boundary surface B. Therefore, when the terahertz wave inspection apparatus 100 intends to estimate the position of the boundary surface B1, the position estimating part 1522 sets the comparison target range WR that includes the pulse PW1 corresponding to the boundary surface B1 as illustrated in FIG. 10A.

Figure 10B:
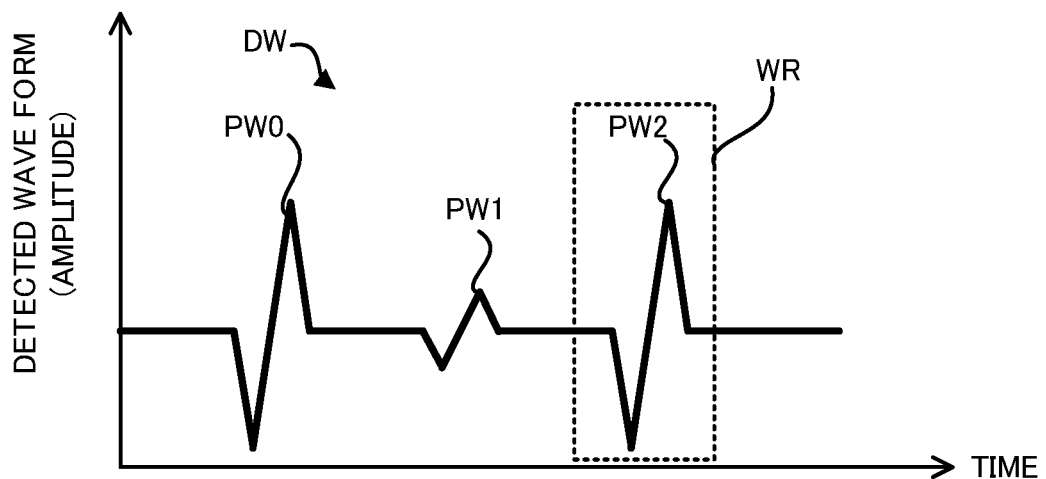

However, the position estimating part 1522 may set the comparison target range WR that does not include the pulse PW corresponding to the terahertz wave THz reflected by the target boundary surface B, depending on a state of the estimated waveform DW, when the terahertz wave inspection apparatus 100 intends to estimate the position of the target boundary surface B. In this case, the position estimating part 1522 may set the comparison target range WR that does not include the pulse PW corresponding to the terahertz wave THz reflected by the target boundary surface B and that includes the pulse PW corresponding to the terahertz wave THz reflected by another boundary surface B that is farther from the outer surface B0 of the sample S than the target boundary surface B is, depending on a state of the estimated waveform DW, when the terahertz wave inspection apparatus 100 intends to estimate the position of the target boundary surface B. For example, the position estimating part 1522 may set the comparison target range WR that does not include the pulse PW1 corresponding to the boundary surface B1 and that includes at least the pulse PW2 corresponding to the boundary surface B2 that is farther from the outer surface B0 of the sample S than the boundary surface B1 is, as illustrated in FIG. 10B, when the terahertz wave inspection apparatus 100 intends to estimate the position of the boundary surface B1.

The position estimating part 1522 may determine whether or not the pulse wave PW is clear in order to determine whether the pulse wave PW is included in the comparison target range WR. In order to determine whether or not the pulse wave PW is clear, the position estimating part 1522 may determine whether or not an amplitude of the pulse wave PW (especially, an amplitude that is normalized by an average value of the amplitude of the detected waveform DW) is smaller than a predetermined amplitude, for example. In order to determine whether or not the pulse wave PW is clear, the position estimating part 1522 may determine whether or not an intensity of the pulse wave PW (especially, an amplitude that is normalized by an average value of the intensity of the detected waveform DW) is smaller than a predetermined intensity, for example. When it is determined that the amplitude of the pulse wave PW is smaller than the predetermined amplitude and/or the intensity of the pulse wave PW is smaller than the predetermined intensity, the position estimating part 1522 may determine that the pulse wave PW is not clear. The position estimating part 1522 may set the comparison target range WR that does not include the pulse wave PW that is determined not to be clear.

A position (namely, a detected time) of the pulse wave PW that should be included in the comparison target range WR varies in the detected waveform DW, depending on the state of the sample S, every time the detected waveform DW is obtained. In this case, the position estimating part 1522 may adjust the comparison target range WR so that the comparison target range WR includes the pulse wave PW the position of which varies.

According to the above described third modified example, the terahertz wave inspection apparatus 100 is capable of adjusting the comparison target range WR depending on the detected waveform DW. Thus, the terahertz wave inspection apparatus 100 is capable of estimating the position of the boundary surface B with high accuracy, compared to the terahertz wave inspection apparatus 100 that is not capable of adjusting the comparison target range WR.

Moreover, even when the terahertz wave inspection apparatus 100 intends to estimate the position of one boundary surface B (for example, the boundary surface B1), when one pulse wave PW (for example, the pulse wave PW1) corresponding to the one boundary surface B is not clear, the terahertz wave inspection apparatus is allowed to set the comparison target range WR that does not include unclear one pulse wave PW. In this case, when the terahertz wave inspection apparatus 100 intends to estimate the position of the one boundary surface B although the one pulse wave PW corresponding to the one boundary surface B is not clear, the terahertz wave inspection apparatus 100 is allowed to set the comparison target range WR that does not include the one pulse wave PW corresponding to the one boundary surface B and that includes another pulse wave PW (for example, the pulse wave PW2) corresponding to another boundary surface B (for example, the boundary surface B2) that is farther from the outer surface B0 of the sample S than the one boundary surface B is. Here, since the another boundary surface B is farther from the outer surface B0 than the one boundary surface B is, the another pulse wave PW is a waveform that is obtained by the terahertz wave THz that passes through the one boundary surface B2 and then is reflected by the another boundary surface B (and then, passes through the one boundary surface B again). Thus, the another pulse wave PW must substantially include not only an information relating to the another boundary surface B (for example, an information relating to the position of the another boundary surface B) but also an information relating to the one boundary surface B (for example, an information relating to the position of the one boundary surface B). Thus, the terahertz wave inspection apparatus 100 is capable of properly estimating the positions of the one boundary surface B on the basis of the another pulse wave PW even when the one pulse wave PW corresponding to the one boundary surface B is not clear.

However, the position estimating part 1522 may always set same comparison target range WR when the detected waveform DW including any pulse wave PW is obtained.

(5-4) Other Modified Example

In the above described description, the terahertz wave inspection apparatus 100 detects the terahertz wave THz reflected by the sample S. However, the terahertz wave inspection apparatus 100 may detect the terahertz wave THz passing through the sample S. In this case, the reference waveform BW is generated on the basis of a detection result of the terahertz wave THz passing through the sample S or the sample member SP.

In the above described description, the terahertz wave inspection apparatus 100 estimates the characteristics of the sample S in which the three layers L (namely, the layer L1 to the layer L3) are laminated. However, the terahertz wave inspection apparatus 100 may estimate the characteristics of the sample in which four or more layers L are laminated. Alternatively, the terahertz wave inspection apparatus 100 may estimate the characteristics of the sample in which two layers L are laminated. Namely, the terahertz wave inspection apparatus 100 may estimate the position of the boundary surface B of two or four or more layers L constituting the sample S.

The present invention is not limited to the above described embodiment. The present invention may be changed without departing from the essence or spirit of the invention which can be read from the claims and the entire specification. Each of an inspection apparatus, an inspection method, a library generation apparatus, a library generation method, a computer program and a recording medium each of which involves such changes is also intended to be within the technical scope of the present invention.

REFERENCE SIGNS LIST

100 terahertz wave inspection apparatus
101 pulse laser apparatus
110 terahertz wave generating element
120 optical delay mechanism
130 terahertz wave detecting element
141 bias voltage generating part
142 I-V converting part
150 controlling part
150*a* CPU
150*b* memory
151 lock-in detecting part
152 signal processing part
1521 library generating part
1521*a* library
1522 position estimating part
161 beam splitter
162, 163 reflective mirror
164 half mirror
LB1 pump light
LB2 probe light
THz terahertz wave
S sample
L, L1, L2, L3 layer
B, B0, B1, B2 boundary surface
DW detected waveform
EW estimated waveform
BW reference waveform
PW0, PW1, PW2 pulse wave

The invention claimed is:

1. An inspection apparatus comprising:
an irradiator that is configured to irradiate a sample in which a plurality of layers are laminated with a terahertz wave;
a detector that is configured to detect the terahertz wave from the sample to obtain a detected waveform; and
a controller that is programmed to estimate a position of a boundary surface of the plurality of layers on the basis of the detected waveform and a library that indicates an estimated waveform of the terahertz wave from the sample,
the library being generated on the basis of a sample waveform that is the detected waveform obtained by irradiating the sample or a sample member with the terahertz wave, the sample member having specifications that are same as those of the sample.

2. The inspection apparatus according to claim 1, wherein the library is generated on the basis of a first pulse waveform that corresponds to an outer surface of the sample or the sample member and that is included in the sample waveform.

3. The inspection apparatus according to claim 2, wherein the library is generated by a simulation using a reference pulse wave that is set on the basis of the first pulse wave.

4. The inspection apparatus according to claim 2, wherein the library is generated by a simulation using a reference pulse wave that is obtained by inverting the first pulse wave.

5. The inspection apparatus according to claim 2, wherein the first pulse wave corresponds to a main pulse of the terahertz wave,
the library is generated on the basis of the first pulse waveform and a second pulse waveform that corresponds to an accompanying pulse included in the terahertz wave to accompany the main pulse of the terahertz wave and that is included in the sample waveform.

6. The inspection apparatus according to claim 5, wherein a frequency of the accompanying pulse is lower than that of the main pulse.

7. The inspection apparatus according to claim 5, wherein the accompanying pulse includes a noise pulse.

8. The inspection apparatus according to claim 5, wherein the library is generated by a simulation using a reference pulse wave that is set on the basis of the first and second pulse waves.

9. The inspection apparatus according to claim 5, wherein the library is generated by a simulation using a reference pulse wave that is obtained by inverting the first and second pulse waves.

10. The inspection apparatus according to claim 2, wherein
the first pulse waveform includes a pulse waveform corresponding to the terahertz that is reflected by the outer surface of the sample or the sample member and that is included in the sample waveform.

11. The inspection apparatus according to claim 2, wherein
the first pulse waveform includes a pulse waveform that is influenced by a reflectance at the outer surface of the sample or the sample member and that is included in the sample waveform.

12. The inspection apparatus according to claim 1, wherein
the controller is further programmed to generate the library.

13. The inspection apparatus according to claim 12, wherein
the irradiator irradiates the sample or the sample member with the terahertz wave,
the detector detects the terahertz wave from the sample or the sample member to obtain the sample waveform,
the controller is programmed to obtain a waveform information relating to the sample waveform from the detecting device and generates the library by using the waveform information.

14. The inspection apparatus according to claim 1, wherein
the controller is programmed to estimate the position of a first boundary surface of the plurality of layers on the basis of a boundary surface pulse waveform and the library, the boundary surface pulse waveform appearing in the detected waveform to correspond to a second boundary surface of the plurality of layers, the second boundary surface being farther from the outer surface than the first boundary surface is.

15. An inspection method including:
an irradiating step at which a terahertz wave is irradiated to a sample in which a plurality of layers are laminated;
a detecting step at which the terahertz wave from the sample is detected to obtain a detected waveform; and
an estimating step at which a position of a boundary surface of the plurality of layers is estimated on the basis of the detected waveform and a library that indicates an estimated waveform of the terahertz wave from the sample,
the library being generated on the basis of a sample waveform that is the detected waveform obtained by irradiating the sample or a sample member with the terahertz wave, the sample member having specifications that are same as those of the sample.

16. A non-transitory computer readable recording medium on which a computer program allowing a computer to execute the inspection method according to claim 15 is recorded.

17. A library generation apparatus comprising a controller,
the controller being programmed to:
obtain a waveform information relating to a detected waveform of a terahertz wave from a sample or a sample member to which the terahertz wave is irradiated, the sample member having specifications that are same as those of the sample; and
generate a library indicating an estimated waveform of the terahertz wave from the sample on the basis of the waveform information.

18. A library generation method including:
an obtaining step at which a waveform information relating to a detected waveform of a terahertz wave from a sample or a sample member to which the terahertz wave is irradiated is obtained, the sample member having specifications that are same as those of the sample; and
a generating step at which a library indicating an estimated waveform of the terahertz wave from the sample is generated on the basis of the waveform information.

19. A non-transitory computer readable recording medium on which a computer program allowing a computer to execute the library generation method according to claim 18 is recorded.

* * * * *